(12) United States Patent
Seidl et al.

(10) Patent No.: US 12,196,589 B2
(45) Date of Patent: Jan. 14, 2025

(54) THERMORESISTIVE MICRO SENSOR DEVICE

(71) Applicant: Infineon Technologies AG, Neubiberg (DE)

(72) Inventors: Martin Seidl, Moosburg a.d. Isar (DE); Christian Bretthauer, Munich (DE); Wolfgang Klein, Zorneding (DE); Ulrich Krumbein, Rosenheim (DE); David Tumpold, Kirchheim beim Munich (DE)

(73) Assignee: Infineon Technologies AG, Neubiberg (DE)

( * ) Notice: Subject to any disclaimer, the term of this patent is extended or adjusted under 35 U.S.C. 154(b) by 29 days.

(21) Appl. No.: 18/065,394

(22) Filed: Dec. 13, 2022

(65) Prior Publication Data

US 2023/0160732 A1    May 25, 2023

Related U.S. Application Data

(62) Division of application No. 16/868,912, filed on May 7, 2020, now abandoned.

(30) Foreign Application Priority Data

Jun. 14, 2019  (EP) ...................... 19180341

(51) Int. Cl.
G01F 1/86      (2006.01)
G01F 1/688     (2006.01)

(52) U.S. Cl.
CPC .............. *G01F 1/6888* (2013.01); *G01F 1/86* (2013.01)

(58) Field of Classification Search
CPC ................................. G01F 1/6888; G01F 1/86
(Continued)

(56) References Cited

U.S. PATENT DOCUMENTS

| 4,733,559 A | 3/1988 | Aine et al. |
| 5,446,437 A | 8/1995 | Bantien et al. |

(Continued)

FOREIGN PATENT DOCUMENTS

GB    2308447 A    6/1997

OTHER PUBLICATIONS

Elwenspoek, M., "Thermal flow micro sensors," in CAS '99 Proceedings International Semiconductor Conference (Cat. No. 99TH8389), Oct. 5-9, 1999, pp. 423-435.

*Primary Examiner* — Alexander A Mercado
*Assistant Examiner* — Rodney T Frank
(74) *Attorney, Agent, or Firm* — Slater Matsil, LLP

(57) ABSTRACT

A thermoresistive micro sensor device includes a semiconductor chip; a through hole, which runs through the semiconductor chip from an upper side to a lower side; electrically conductive structures, wherein the middle section of each of the electrically conductive structures spans over the through hole at the upper side of the semiconductor chip; an electrically insulating arrangement for electrically insulating the electrically conductive structures and the semiconductor chip from each other, wherein the through hole runs through the electrically insulating arrangement; and a contact arrangement including contacts, wherein each of the contacts is electrically connected to one of the first end sections or one of the second end sections, so that electrical energy is fed to at least one of the electrically conductive structures to heat the respective electrically conductive structure, and so that an electrical resistance of one of the electrically conductive structures is measured at the contact arrangement.

20 Claims, 20 Drawing Sheets

(58) Field of Classification Search
USPC .................................................... 73/204.23
See application file for complete search history.

(56) References Cited

U.S. PATENT DOCUMENTS

| | | |
|---|---|---|
| 2001/0000298 A1 | 4/2001 | Wienand et al. |
| 2007/0209433 A1 | 9/2007 | Gehman et al. |
| 2010/0242592 A1 | 9/2010 | Haneef et al. |
| 2012/0318058 A1* | 12/2012 | Kimura ............... G01L 19/0092 |
| | | 374/1 |

* cited by examiner

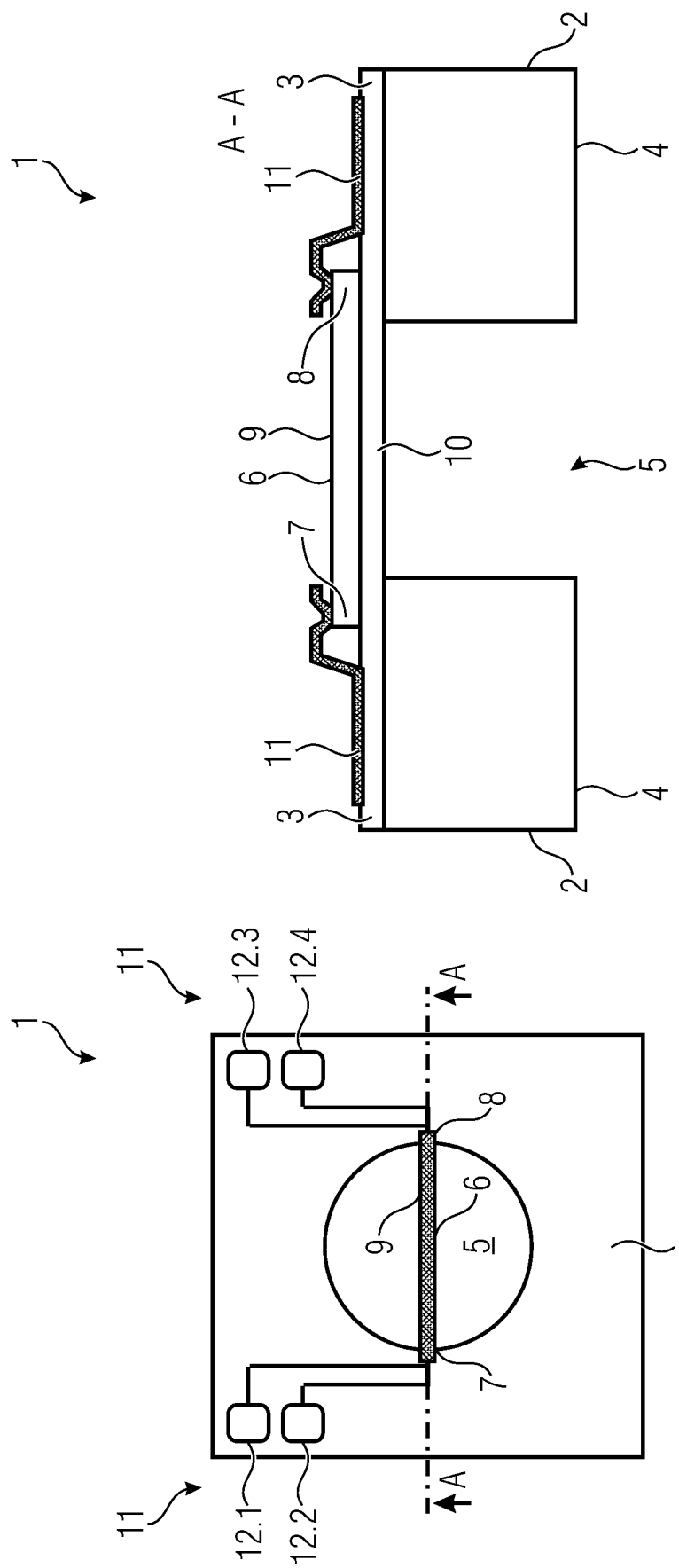

THERMORESISTIVE MICRO SENSOR DEVICE

This application is a divisional of U.S. patent application Ser. No. 16/868,912, filed May 7, 2020, which application claims the benefit of European Patent Application No. 19180341, filed on Jun. 14, 2019, which applications are hereby incorporated herein by reference.

TECHNICAL FIELD

Embodiments relate to a thermoresistive micro sensor device for a mass flow meter for measuring a mass flow of a fluid or for a pressure meter for measuring a pressure in a fluid. Further embodiments relate to a mass flow meter for measuring a mass flow of a fluid and to a pressure meter for measuring a pressure in a fluid.

BACKGROUND

Thermoresistive micro sensor devices and thermal flow sensors in general are known in the art. Thermal flow sensors are transducers, which comprise heaters and temperature sensors. The heat interacts with the surrounding: a streaming liquid carries away some heat and the temperature distribution around the heater changes in conjunction with the moving fluid. In particular, the temperature of the heater depends on the flow. Silicon micromachining allows the fabrication of small components where many different functions (e.g. arrays of temperature sensors and heaters, pressure sensors, shear stress sensors, etc.) can be integrated so that the functionality of the sensors can be increased. Furthermore, due to the small size of the elements these sensors can be quite fast. Speed is important in turbulent flow and in acoustics.

SUMMARY

A thermoresistive micro sensor device for a mass flow meter for measuring a mass flow of a fluid or for a pressure meter for measuring a pressure in a fluid is provided. The thermoresistive micro sensor device comprises a semiconductor chip having an upper side and a lower side;

at least one through hole, which runs through the semiconductor chip from the upper side to the lower side;

one or more electrically conductive structures, wherein each of the electrically conductive structures comprises a first end section, a second end section and a middle section being arranged between the first end section and the second end section, wherein the first end section and the second end section of each of the electrically conductive structures are mounted to the semiconductor chip so that the middle section of each of the electrically conductive structures spans over the through hole at the upper side of the semiconductor chip;

an electrically insulating arrangement configured for electrically insulating the one or more electrically conductive structures and the semiconductor chip from each other, wherein the through hole runs through the electrically insulating arrangement; and a contact arrangement comprising a plurality of contacts, wherein each of the plurality of contacts is electrically connected to one of the first end sections or to one of the second end sections, so that electrical energy, which is supplied to the contact arrangement, is fed to at least one of the electrically conductive structures in order to heat the respective electrically conductive structure, and so that an electrical resistance of one of the electrically conductive structures may be measured at the contact arrangement.

In this document terms like "upper", "lower" and other terms related to directions or locations refer to an orientation of the thermoresistive micro sensor device in which the semiconductor chip is orientated parallelly to the Earth's surface and in which the lower side of the semiconductor chip is facing towards the Earth's surface.

A thermoresistive sensor device is a sensor device which exploits the effect that an electrical resistance of an electrically conductive structure depends on its temperature.

The thermoresistive micro sensor device may have a vertical extension in the range of a few micrometers and a horizontal extension in the range of a few millimeters. The semiconductor chip can be made of silicon and the conductive structures may be made of polysilicon.

The electrically insulating arrangement can be made of any insulating material. In particular they can be made of Silicon nitride (SiN), which has a high tensile strength and is electrically and thermally insulating. It may comprise one or more layers which may be made of different insulating materials. The purpose of the electrically insulating arrangement is to separate the semiconductor chip on one hand and the contact arrangement on the on the other hand electrically. Furthermore, it may electrically separate different electrically conductive structures from each other. In the same way it may prevent one of the electrically conductive structures from being shortcut. Also it may electrically separate and insulate the contacts from each other.

The middle sections of the electrically conductive structures may be mechanically supported by a portion of the electrically insulating arrangement which spans over the through hole of the semiconductor chip.

The electrically conductive structures are preferably manufactured from materials having a high temperature coefficient, such as poly-silicon (poly-Si), platinum (Pt), tantalum (Ta) or tungsten (W).

The electrically conductive structures may have a wire-like shape having a (transverse) width between 0.5-20 μm (typical 3 μm), having a length between 100-2.000 μm (typical 800 μm) and a (vertical) thickness between 100-1.500 nm (typical 500 nm).

The contact arrangement is configured in such way that electrical energy fed to the contact arrangement whereas at least one of the electrically conductive structures in order to heat the respective electrically conductive structure. This will increase the temperature of at least one of the electrically conductive structures so that the resistance of the respective electrically conductive structure will change. The change of the resistance depends on a temperature coefficient of the material of the respective electrically conductive structure.

However, the temperature change does not only depend on the amount of electric energy fed to the electrically conductive structure but also on environmental conditions. For example, if the electrically conductive structure which is heated by the electric energy is surrounded by a fluid, which may be a gas or a liquid, the temperature distribution will change if the fluid is in motion adjacent to the electrically conductive structure. This is because the flowing fluid transports heat away from the electrically conductive structure, so that the temperature distribution around the electrically conductive structures depends on the mass flow of the fluid. As a result, the mass flow may be measured by measuring the resistance of the electrically conductive structure.

If, however, the mass flow of the fluid is zero, low or known the temperature distribution can be exploited for measuring the pressure of the fluid as a heat transport capacity of the fluid depends on the pressure of the fluid. Generally one can say that at higher pressures the heat transport capacity is higher so that more heat energy may be transported away from the heated electrically conductive structure. As a result, the pressure may be measured by measuring the resistance of the electrically conductive structure. The resistance can be measured by measuring a relative change of the resistance or by measuring a value of the resistance.

In order to measure the resistance of the electrically conductive structure, contact arrangement is configured in such way that the resistance can be measured at the contact arrangement.

The contact arrangement may comprise contact pads for connecting the thermoresistive micro sensor device to an external electrical energy supply unit for supplying the electrical energy and for connecting the thermoresistive micro sensor device to an external measuring unit for measuring the electrical resistance. However, the contact arrangement can also be configured for directly connecting the thermoresistive micro sensor device to an electrical energy supply unit and/or to a measuring unit which is/are arranged at the semiconductor chip of the thermoresistive micro sensor device.

The through hole, which runs through the semiconductor chip, minimizes an impact of the semiconductor chip to a temperature distribution around the electrically conductive structures. Whereby, a sensitivity of the disclosed thermoresistive micro sensor device may be increased. Moreover, a higher accuracy may be achieved. Furthermore, a response time of the thermoresistive micro sensor device may be decreased.

The thermoresistive micro sensor device is, in particular, suitable for applications in which low mass flows need to be detected. For example, it is suitable for precise dosage in microreactors, medical or chemical applications, in particular for in-situ analysis etc. It can be used as the sensing sub part (component) of a micro-dosing device or a particle monitoring device. Two (or more) thermoresistive micro sensor devices in a row can be used to detect a flow direction and/or for increased sensibility. The thermoresistive micro sensor device can enable mobile medical applications and is smaller and more cost economic compared to conventional state of the art sensors. Moreover, it can be integrated monolithically within other MEMS sensor and/or actuator systems.

The thermoresistive micro sensor device can alternatively be used for sensing pressure. In this case the fluid flow is either fixed (and known) or non-existent. The heat transport depends here directly on the pressure of the fluid. Changes in the heat transport result in a change of the temperature distribution of the electrically conductive structure or the electrically conductive structures. The changes in the temperature distribution can be detected by a shift in resistance, allowing for pressure sensing.

The thermoresistive micro sensor device can be produced on a single wafer using state of the art semiconductor manufacturing processes. The layout can be manufactured at all conventional chip sizes, which enables integration into mobile devices and a broad range of measurable flow velocities. It may provide a low fluidic resistance due to large inlet/outlet cross-section area and has no moving parts.

The thermoresistive micro sensor device can be driven either with a constant power, with a constant voltage, with a constant current or in a force feedback mode, each in AC or DC.

According to some embodiments the one or more electrically conductive structures comprise an electrically conductive heating and sensing structure, wherein the electrical energy from the contact arrangement is fed to the electrically conductive sensing and heating structure, and wherein the electrical resistance, which may be measured at the contact arrangement, is an electrical resistance of the electrically conductive heating and sensing structure.

The electrically conductive heating and sensing structure may be heated by an electrical heating current flowing through it. Also, it may be heated by applying external optical energy or electromagnetic energy to it. For example, the electrically conductive heating and sensing structure may be heated by shining light on it so that it absorbs the energy. In other examples, the electrically conductive heating and sensing structure may be heated by using high frequency electromagnetic fields which cause power losses in in the electrically conductive heating structure.

In this case at least one electrically conducting structure is, at the same time, used for heating and for sensing. The heat is transported away from the electrically conductive heating and sensing structure by the fluid so that the resistance of the electrically conductive heating and sensing structure changes due to a temperature change caused by a change of a mass flow or a pressure of the fluid. Such embodiments can be manufactured at very low costs.

According to some embodiments in a top view a cross section of the through hole in the electrically insulating arrangement is smaller than a cross section of the through hole in the semiconductor chip. By these features the effective cross-section of the through hole may be decreased so that—at a given mass flow—a speed of the fluid is increased, which results in a higher sensitivity, in particular at low mass flows.

According to some embodiments the first end section of one of the electrically conductive structures is connected to a first contact of the contact arrangement and to a second contact of the contact arrangement, and wherein the second end section of the one of the electrically conductive structures is connected to a third contact of the contact arrangement and to a fourth contact of the contact arrangement. Such embodiments enable the use of four-terminal sensing, which is also known as Kelvin sensing, and which allows to measure very low resistances at high precision so that the measuring accuracy of the device may be increased.

According to some embodiments in a top view a transverse width of the middle section of one of the electrically conductive structures increases from a central portion of the middle section to the first end section of the middle section and from the central portion of the middle section to the second end section of the middle section. In this case the resistance around the central portion of the middle section is higher than the resistance of the middle section close to the end sections which increases the sensitivity of the device.

According to some embodiments in a top view the middle section of one of the electrically conductive structures comprises a plurality of electrically conductive substructures parallelly arranged to a direction from the first end section of the one of the electrically conductive structures to the second end section of the one of the electrically conductive structures, wherein the electrically conductive substructures are separated by one or more elongated openings. These features further increase the sensitivity of the device.

According to some embodiments the middle section of the one of the electrically conductive structures comprises at least one electrically insulating support element, which mechanically connects at least some of the electrically conductive substructures, and which spans at least over one of the elongated openings at an angle to the direction from the first end section of the one of the electrically conductive structures to the second end section of the one of the electrically conductive structures. By these features a mechanical stability of the device may be increased.

According to some embodiments in a top view the middle section of one of the electrically conductive structures comprises a frame-like portion having in a top view a frame-like shape. The term frame-like shape refers to any shape of the electrically conductive structure which enframes in a top view a predominant portion of the cross-section of the through hole. For example, it may refer to the ring-like shape. These features may increase the sensitivity of the device by optimizing and heat transfer to or from the fluid.

According to some embodiments in a top view the middle section of one of the electrically conductive structures comprises a perforated portion having in a top view a two-dimensional perforation comprising a plurality of through holes. These features may increase the sensitivity of the device by optimizing and heat transfer to or from the fluid.

According to some embodiments the one or more electrically conductive structures comprise a plurality of electrically conductive structures which are spaced in a horizontal direction apart from each other. These features may increase the sensitivity of the device.

According to some embodiments the one or more electrically conductive structures comprise an electrically conductive heating structure and an electrically conductive sensing structure being different from the electrically conductive heating structure, wherein the electrical energy from the contact arrangement is fed to the electrically conductive heating structure, and wherein the electrical resistance, which may be measured at the contact arrangement, is the electrical resistance of the electrically conductive sensing structure.

The electrically conductive heating structure may be heated by an electrical heating current flowing through it. Also, it may be heated by applying external optical energy or electromagnetic energy to it. For example, the electrically conductive heating structure may be heated by shining light on it so that it absorbs the energy. In other examples, the electrically conductive heating structure may be heated by using high frequency electromagnetic fields which cause power losses in the electrically conductive heating structure.

By these features the functions of heating and sensing are executed by different structures so that a current for heating the device and a current for sensing the resistance are independent from each other. By these features the sensitivity, the accuracy and the time response may be further enhanced.

According to some embodiments an electrostatic actuator is configured for electro-statically deflecting the electrically conductive heating structure and/or the electrically conductive sensing structure so that a distance between the electrically conductive heating structure and the electrically conductive sensing structure may be changed by applying a first voltage to the electrostatic actuator.

According to some embodiments a piezoelectric actuator is configured for deflecting the electrically conductive heating structure and/or the electrically conductive sensing structure so that a distance between the electrically conductive heating structure and the electrically conductive sensing structure may be changed by applying a second voltage to the piezoelectric actuator.

According to some embodiments a thermomechanical actuator is configured for deflecting the electrically conductive heating structure and/or the electrically conductive sensing structure so that a distance between the electrically conductive heating structure and the electrically conductive sensing structure may be changed by applying a current to the thermomechanical actuator.

Different distances between heating/sensing-structures are beneficial for a high sensitivity in different pressure ranges and/or mass flow ranges and thus increase a total measurement range.

According to some embodiments the one or more electrically conductive structures comprise a plurality of electrically conductive structures which are spaced in a vertical direction apart from each other. Such features allow detecting the flow direction of the fluid and/or increasing the sensitivity of the device.

In a further aspect a mass flow meter for measuring a mass flow of a fluid is provided. The mass flow meter comprises
 a thermoresistive micro sensor device as described herein;
 an electrical energy supply unit for supplying the electrical energy to the contact arrangement; and
 a measuring unit for measuring the electrical resistance at the contact arrangement;
 wherein the measuring unit is configured for measuring the mass flow of the fluid flowing through the through hole depending on the electrical resistance.

In a further aspect a pressure meter for measuring a pressure in a fluid is provided. The pressure meter comprises
 a thermoresistive micro sensor device as described herein;
 an electrical energy supply unit for supplying the electrical energy to the contact arrangement; and
 a measuring unit for measuring the electrical resistance at the contact arrangement;
 wherein the measuring unit is configured for measuring the pressure of the fluid at the through hole depending on the electrical resistance.

In some embodiments the electrical energy supply unit of the mass flow meter or the pressure meter is configured for supplying the electrical energy as an alternating current or an alternating voltage. By these features a modulated signal can be generated so that the signal-to-noise ratio can be improved by an AC-band-pass filter.

In some embodiments the electrical energy supply unit of the mass flow meter or the pressure meter comprises a control unit configured for controlling the electrostatic actuator, the piezoelectric actuator and/or thermomechanical actuator.

BRIEF DESCRIPTION OF THE DRAWINGS

Embodiments of the present invention are described herein making reference to the appended drawings.

FIG. 1 shows a schematic top view of a first embodiment of a thermoresistive micro sensor device;

FIG. 2 shows a schematic cross-sectional side view of the first embodiment of the thermoresistive micro sensor device;

FIG. 10 shows a schematic top view of the eighth embodiment of a thermoresistive micro sensor device, wherein the electrostatic actuator is switched on;

Figure 3:
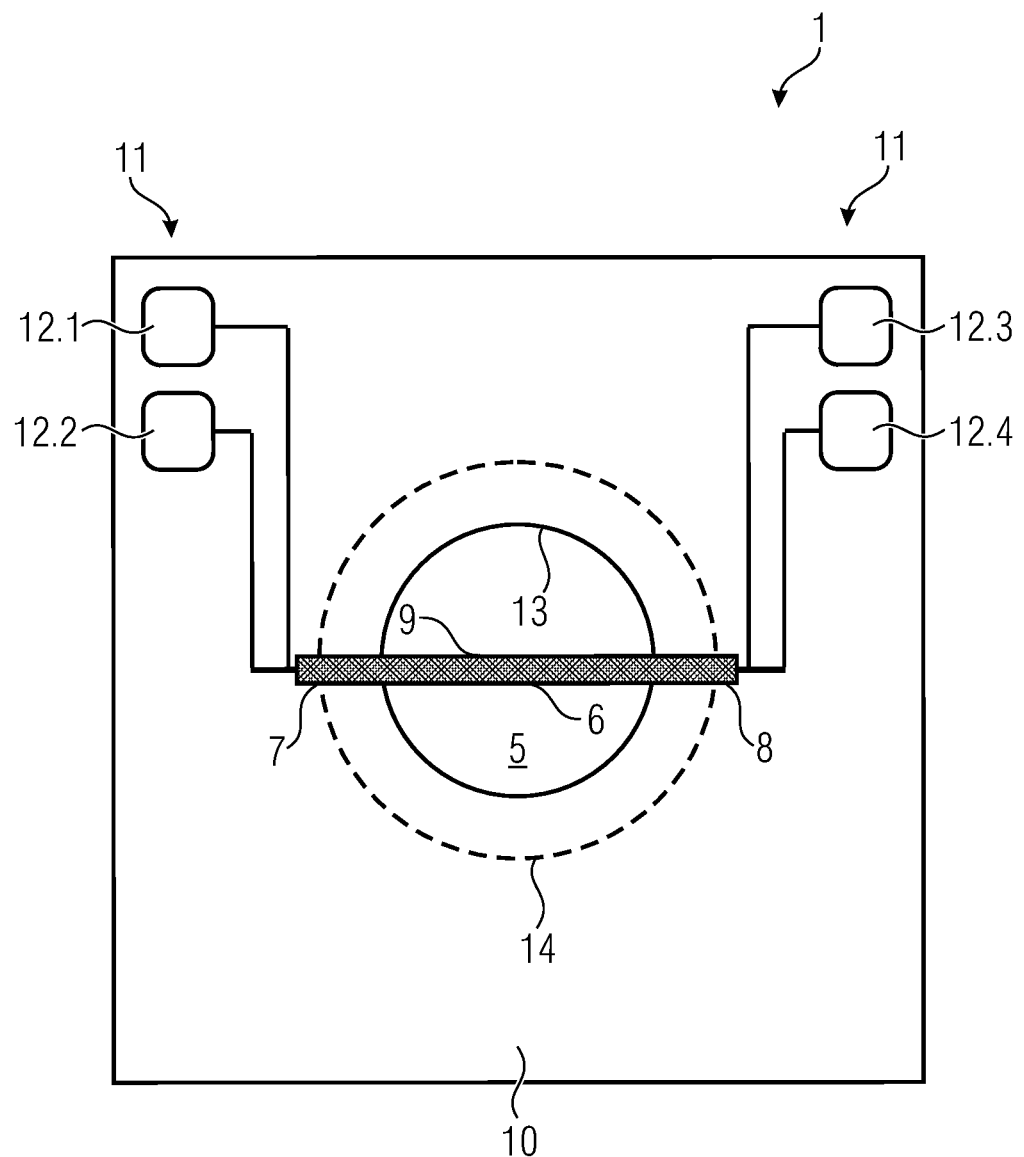
FIG. 3 shows a schematic top view of a second embodiment of a thermoresistive micro sensor device.

Equal or equivalent elements or elements with equal or equivalent functionality are denoted in the following description by equal or equivalent reference numerals.

DETAILED DESCRIPTION OF ILLUSTRATIVE EMBODIMENTS

In the following description, a plurality of details is set forth to provide a more thorough explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

FIG. 1 shows a schematic top view of a first embodiment of a thermoresistive micro sensor device 1 and FIG. 2 shows a schematic cross-sectional side view of the first embodiment of the thermoresistive micro sensor device 1.

The thermoresistive micro sensor device for a mass flow meter for measuring a mass flow of a fluid or for a pressure meter for measuring a pressure in a fluid, the thermoresistive micro sensor device 1 comprises a semiconductor chip 2 having an upper side 3 and a lower side 4;

at least one through hole 5, which runs through the semiconductor chip 2 from the upper side 3 to the lower side 4;

one or more electrically conductive structures 6, wherein each of the electrically conductive structures 6 comprises a first end section 7, a second end section 8 and a middle section 9 being arranged between the first end section 7 and the second end section 8, wherein the first end section 7 and the second end section 8 of each of the electrically conductive structures 6 are mounted to the semiconductor chip 2 so that the middle section 9 of each of the electrically conductive structures 6 spans over the through hole 5 at the upper side 3 of the semiconductor chip 2;

an electrically insulating arrangement 10 configured for electrically insulating the one or more electrically conductive structures 6 and the semiconductor chip 2 from each other, wherein the through hole 5 runs through the electrically insulating arrangement 10; and a contact arrangement 11 comprising a plurality of contacts 12, wherein each of the plurality of contacts 12 is electrically connected to one of the first end sections 7 or to one of the second end sections 8, so that electrical energy, which is supplied to the contact arrangement 11, is fed to at least one of the electrically conductive structures 6 in order to heat the respective electrically conductive structure 6, and so that an electrical resistance of one of the electrically conductive structures 6 may be measured at the contact arrangement 11.

According to some embodiments the one or more electrically conductive structures 6 comprise an electrically conductive heating and sensing structure 6, wherein the electrical energy from the contact arrangement 11 is fed to the electrically conductive sensing and heating structure 6, and wherein the electrical resistance, which may be measured at the contact arrangement 11, is an electrical resistance of the electrically conductive heating and sensing structure 6.

According to some embodiments the first end section 7 of one of the electrically conductive structures 6 is connected to a first contact 12.1 of the contact arrangement 11 and to a second contact 12.2 of the contact arrangement 11, and the second end section 8 of the one of the electrically conductive structures 6 is connected to a third contact 12.3 of the contact arrangement 11 and to a fourth contact 12.4 of the contact arrangement 11.

FIG. 1 and FIG. 2 show a simple layout for four-terminal sensing with a single heating wire in a schematic representation. The electrically conductive structure 6 is used for sensing and for heating. It is suspended above the through hole 5, supported (at the ends) by a membrane 10 manufactured from (thermally and electrically) isolating material. The contacts 12.1 and 12.2 are electrically connected to the first end section 7 and the contacts 12.3 and 12.4 are connected to the second and section 8 of the electrically conductive structure 6.

FIG. 3 shows a schematic top view of a second embodiment of a thermoresistive micro sensor device 1. The second embodiment is based on the first embodiment.

According to some embodiments in a top view a cross section 13 of the through hole 5 in the electrically insulating arrangement 10 is smaller than a cross section 14 of the through hole 5 in the semiconductor chip 2. By the reduced opening in the electrically insulating arrangement 10 a higher sensitivity may be achieved as the speed of the fluid is increased for a certain mass flow.

Figure 4:
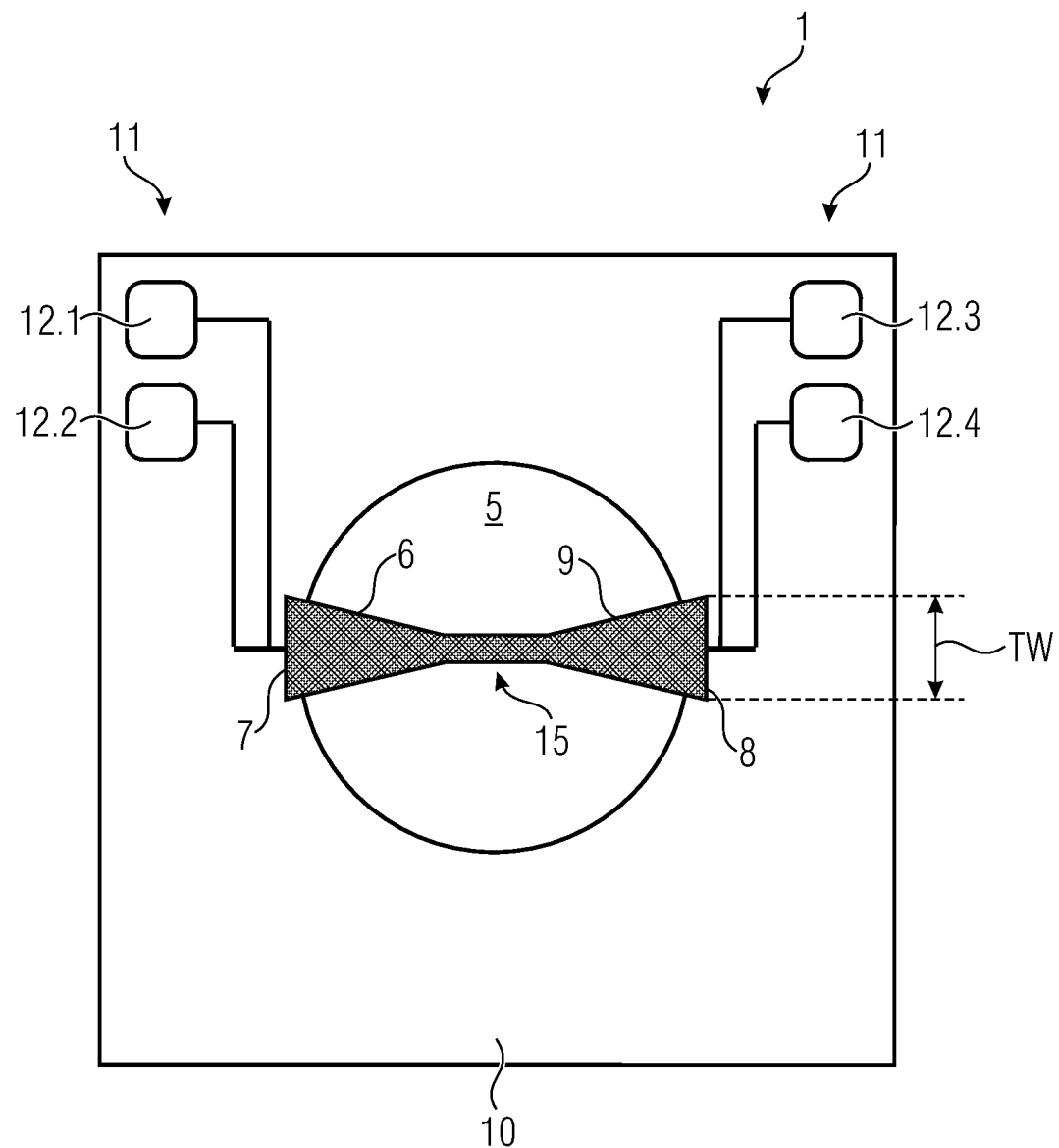
FIG. 4 shows a schematic top view of a third embodiment of a thermoresistive micro sensor device.

FIG. 4 shows a schematic top view of a third embodiment of a thermoresistive micro sensor device 1. The third embodiment is also based on the first embodiment.

According to some embodiments in a top view a transverse width TW of the middle section 9 of one of the electrically conductive structures 6 increases from a central portion of the middle section 9 to the first end section 7 of the middle section 9 and from the central portion to the second end section 8 of the middle section 9.

Figure 5:
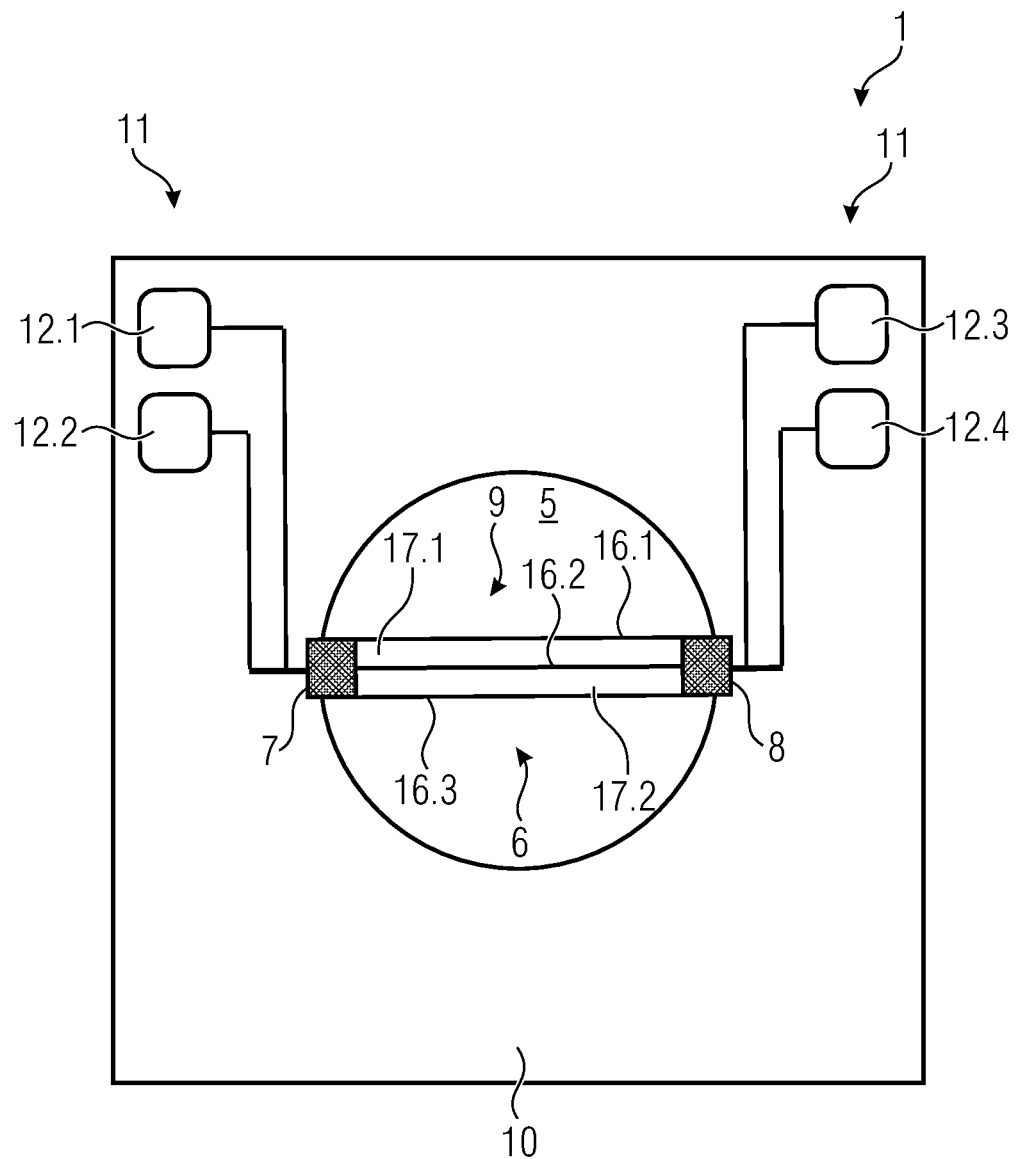
FIG. 5 shows a schematic top view of a fourth embodiment of a thermoresistive micro sensor device.

FIG. 5 shows a schematic top view of a fourth embodiment of a thermoresistive micro sensor device 1. The fourth embodiment is also based on the first embodiment.

According to some embodiments in a top view the middle section 9 of one of the electrically conductive structures 6 comprises a plurality of electrically conductive substructures 16 parallelly arranged to a direction from the first end section 7 of the one of the electrically conductive structures 6 to the second end section 8 of the one of the electrically conductive structures 6, wherein the electrically conductive sub-structures 16 are separated by one or more elongated openings 17.

Figure 6:
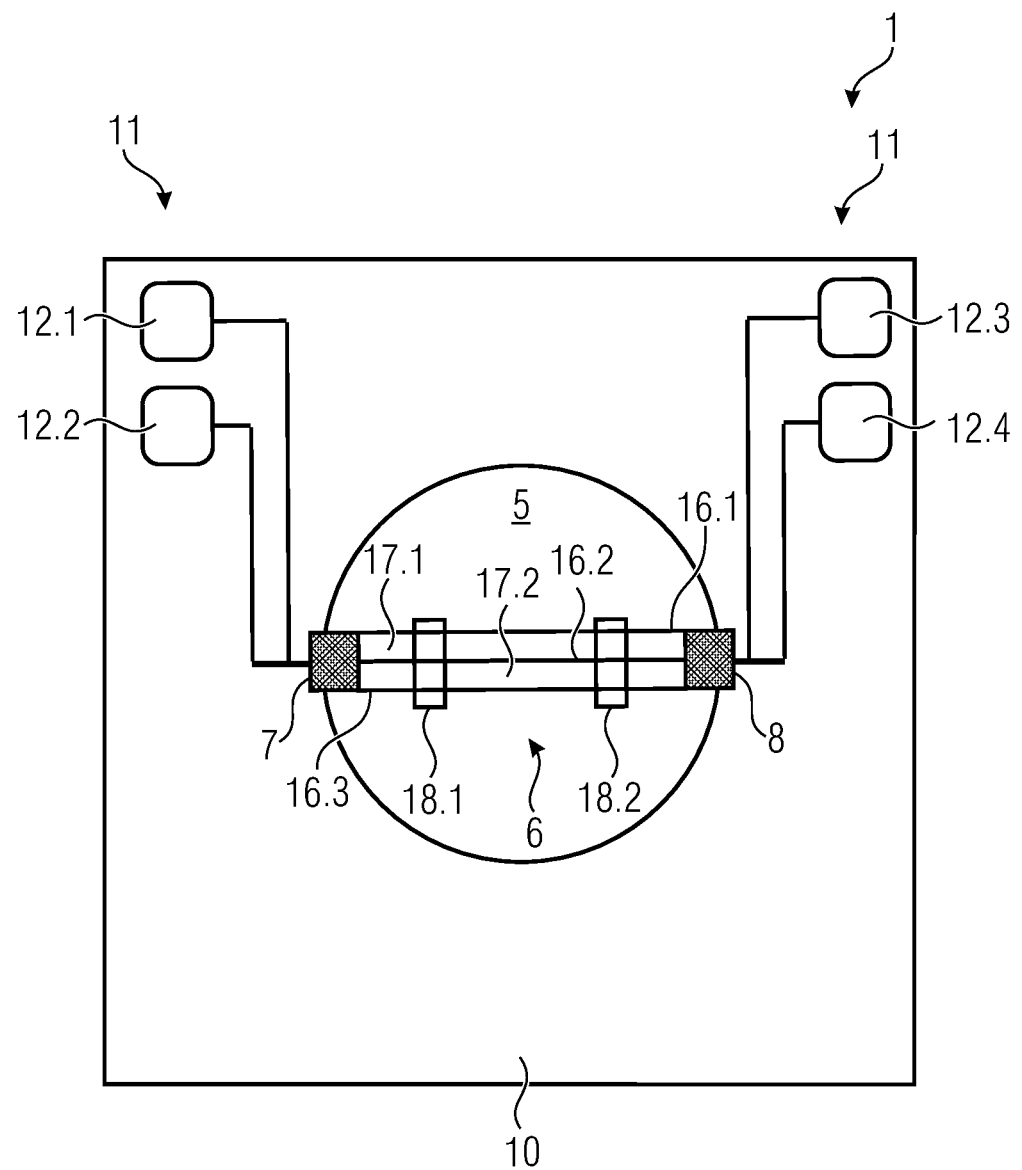
FIG. 6 shows a schematic top view of a fifth embodiment of a thermoresistive micro sensor device.

FIG. 6 shows a schematic top view of a fifth embodiment of a thermoresistive micro sensor device 1. The fifth embodiment is also based on the first embodiment.

According to some embodiments the middle section 9 of the one of the electrically conductive structures 6 comprises at least one electrically insulating support element 18, which mechanically connects at least some of the electrically conductive substructures 16, and which spans at least over one of the elongated openings 17 at an angle to the direction from the first end section 7 of the one of the electrically conductive structures 6 to the second end section 8 of the one of the electrically conductive structures 6.

Figure 7:
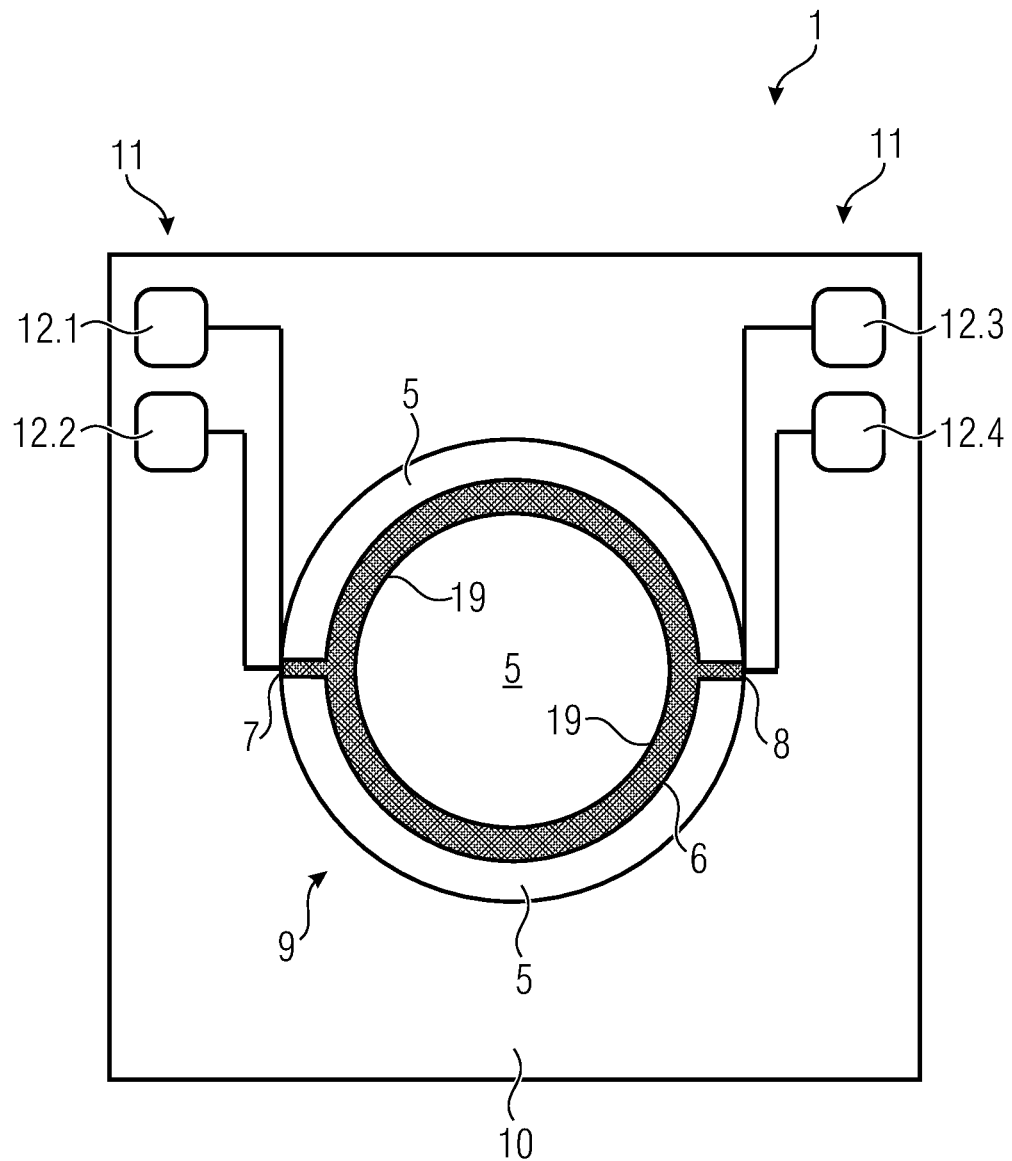
FIG. 7 shows a schematic top view of a sixth embodiment of a thermoresistive micro sensor device.

FIG. 7 shows a schematic top view of a sixth embodiment of a thermoresistive micro sensor device 1. The sixth embodiment is also based on the first embodiment.

According to some embodiments in a top view the middle section 9 of one of the electrically conductive structures 6 comprises a frame-like portion 19 having in a top view a frame-like shape. Shown is an exemplary layout with a ring-shaped heating structure to optimize the heat transfer to and from the fluid.

Figure 8:
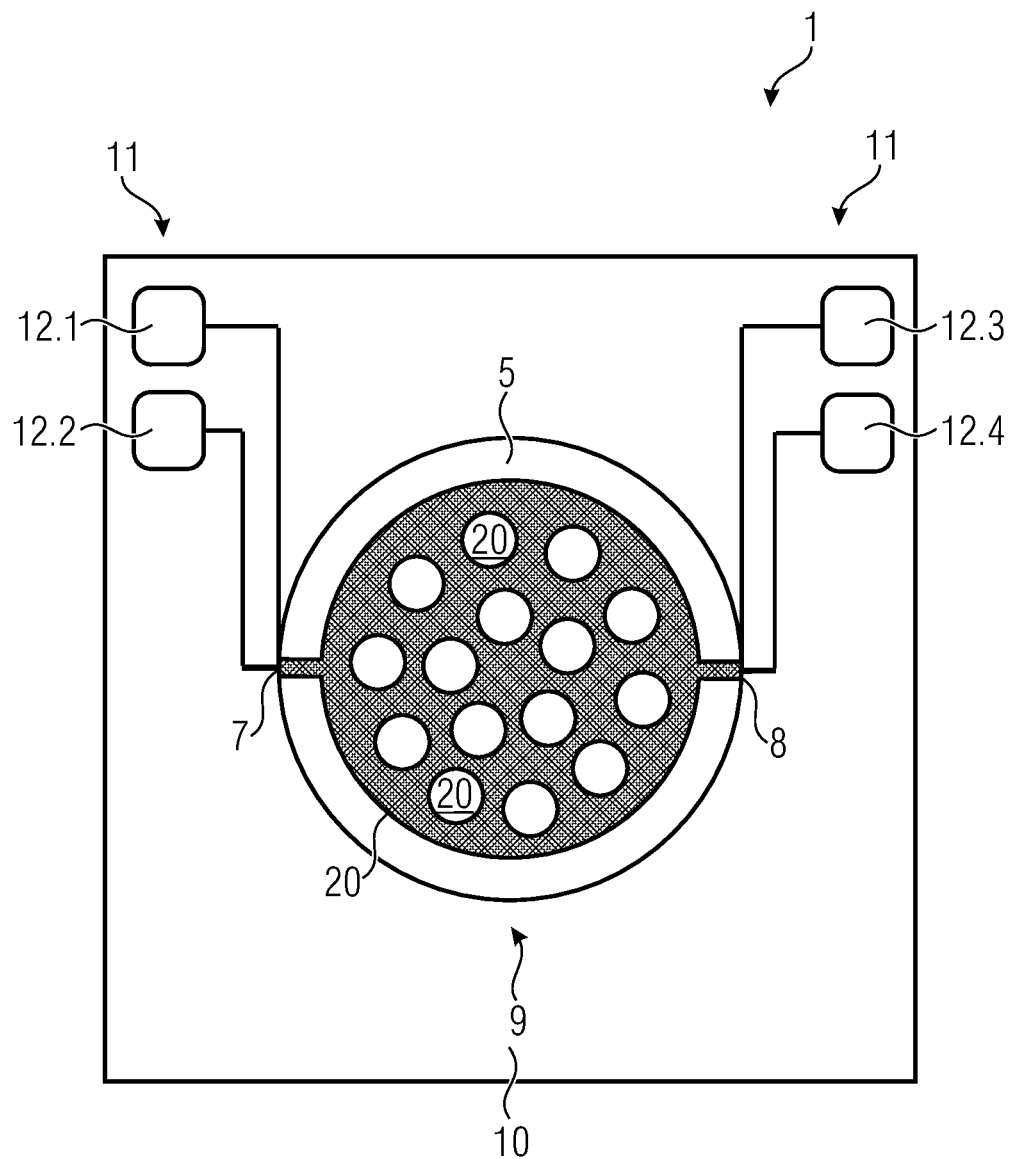
FIG. 8 shows a schematic top view of a seventh embodiment of a thermoresistive micro sensor device.

FIG. 8 shows a schematic top view of a seventh embodiment of a thermoresistive micro sensor device 1. The seventh embodiment is also based on the first embodiment.

According to some embodiments in a top view the middle section 9 of one of the electrically conductive structures 6 comprises a perforated portion 20 having in a top view a two-dimensional perforation comprising a plurality of through holes 21.

Shown here is an exemplary layout with a perforated membrane acting as the heating/sensing structure 6, to increase contact surface with the fluid and thus increase heat transfer. By shaping the holes and/or arranging the perforation density among the membrane, flow profiles can be integrated and weighted for measurements; featuring their thermal and flow gradients.

Figure 9:
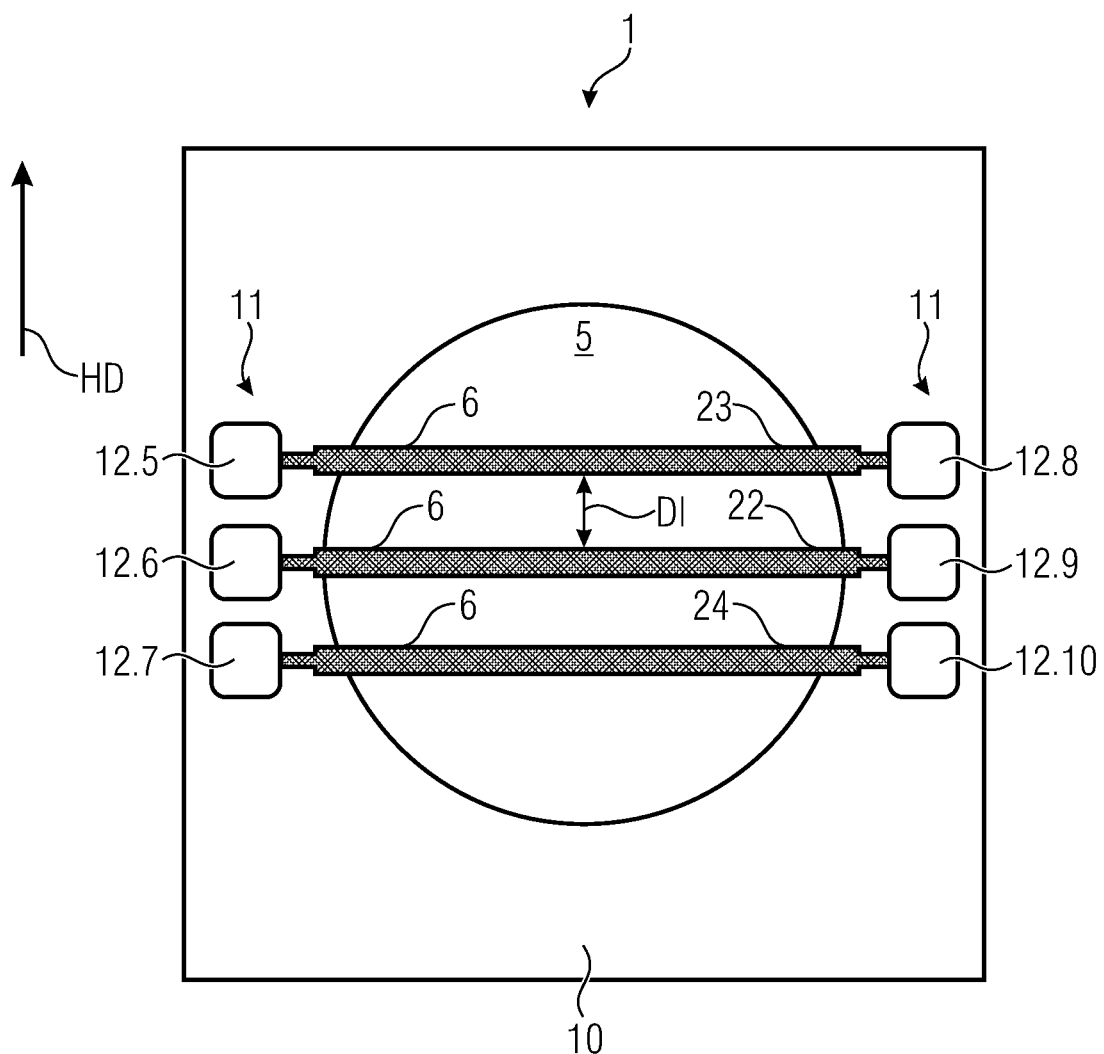
FIG. 9 shows a schematic top view of an eighth embodiment of a thermoresistive micro sensor device, wherein an electrostatic actuator is switched off.
Figure 10:
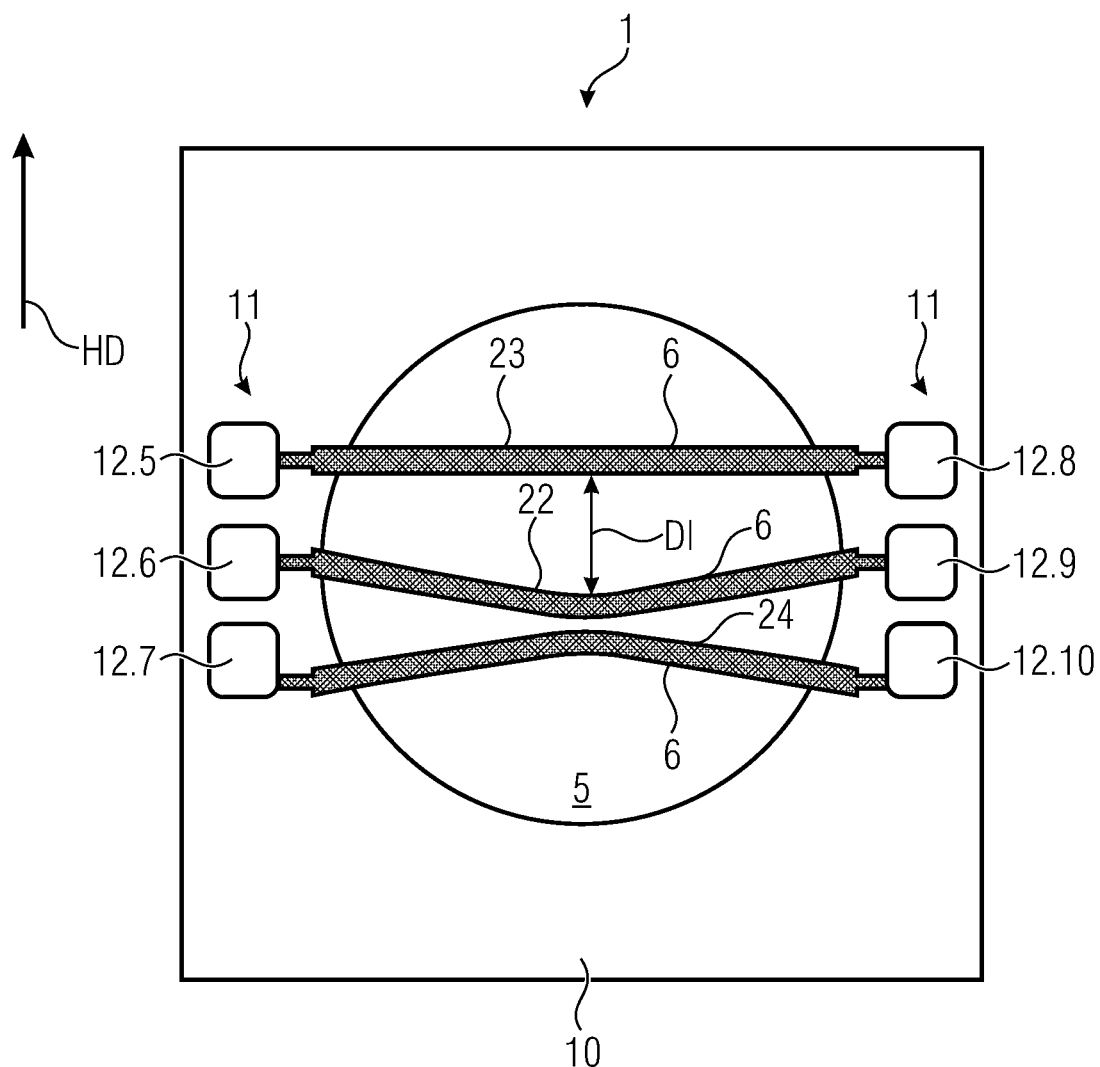

FIG. 9 shows a schematic top view of an eighth embodiment of a thermoresistive micro sensor device 1, wherein an electrostatic actuator 24 is switched off and FIG. 10 shows a schematic top view of the eighth embodiment of a thermoresistive micro sensor device 1, wherein the electrostatic actuator 24 is switched on.

According to some embodiments the one or more electrically conductive structures 6 comprise a plurality of electrically conductive structures 22, 23 which are spaced in a horizontal direction HD apart from each other.

According to some embodiments the one or more electrically conductive structures 6 comprise an electrically conductive heating structure 22 and an electrically conductive sensing structure 23 being different from the electrically conductive heating structure 22, wherein the electrical energy, which is supplied to the contact arrangement 11, is fed to the electrically conductive heating structure 22, and wherein the electrical resistance, which may be measured at the contact arrangement 11, is the electrical resistance of the electrically conductive sensing structure 23.

According to some embodiments an electrostatic actuator 24 is configured for electrostatically deflecting the electrically conductive heating structure 22 and/or the electrically conductive sensing structure 23 so that a distance DI between the electrically conductive heating structure 22 and the electrically conductive sensing structure 23 may be changed by applying a first voltage to the electrostatic actuator 24.

According to some embodiments a piezoelectric actuator is configured for deflecting the electrically conductive heating structure 22 and/or the electrically conductive sensing structure 23 so that a distance DI between the electrically conductive heating structure 22 and the electrically conductive sensing structure 23 may be changed by applying a second voltage to the piezoelectric actuator.

According to some embodiments a thermomechanical actuator is configured for deflecting the electrically conductive heating structure 22 and/or the electrically conductive sensing structure 23 so that a distance DI between the electrically conductive heating structure 22 and the electrically conductive sensing structure 23 may be changed by applying a current to the thermomechanical actuator.

The electrically conductive heating structure 22 is electrically connected to the contacts 12.6 and 12.9. The electrically conductive sensing structure 23 is electrically connected to the contacts 12.5 and 12.8. Further, the electrostatic actuator 24 is electrically connected to the contacts 12.7 and 12.10. By applying a first voltage to at least one of the contacts 12.7 and 12.10 the electrically conductive heating structure 22 may be deflected so that the distance DI between the electrically conductive heating structure 22 and the electrically conductive sensing structure 23 is changed. Different distances DI are in particular beneficial for sensitivity in different pressure ranges and thus increase total measurement range.

The electrostatic actuator 24 may be replaced by a piezoelectric actuator (not shown) or a thermomechanical actuator (not shown).

Figure 11:
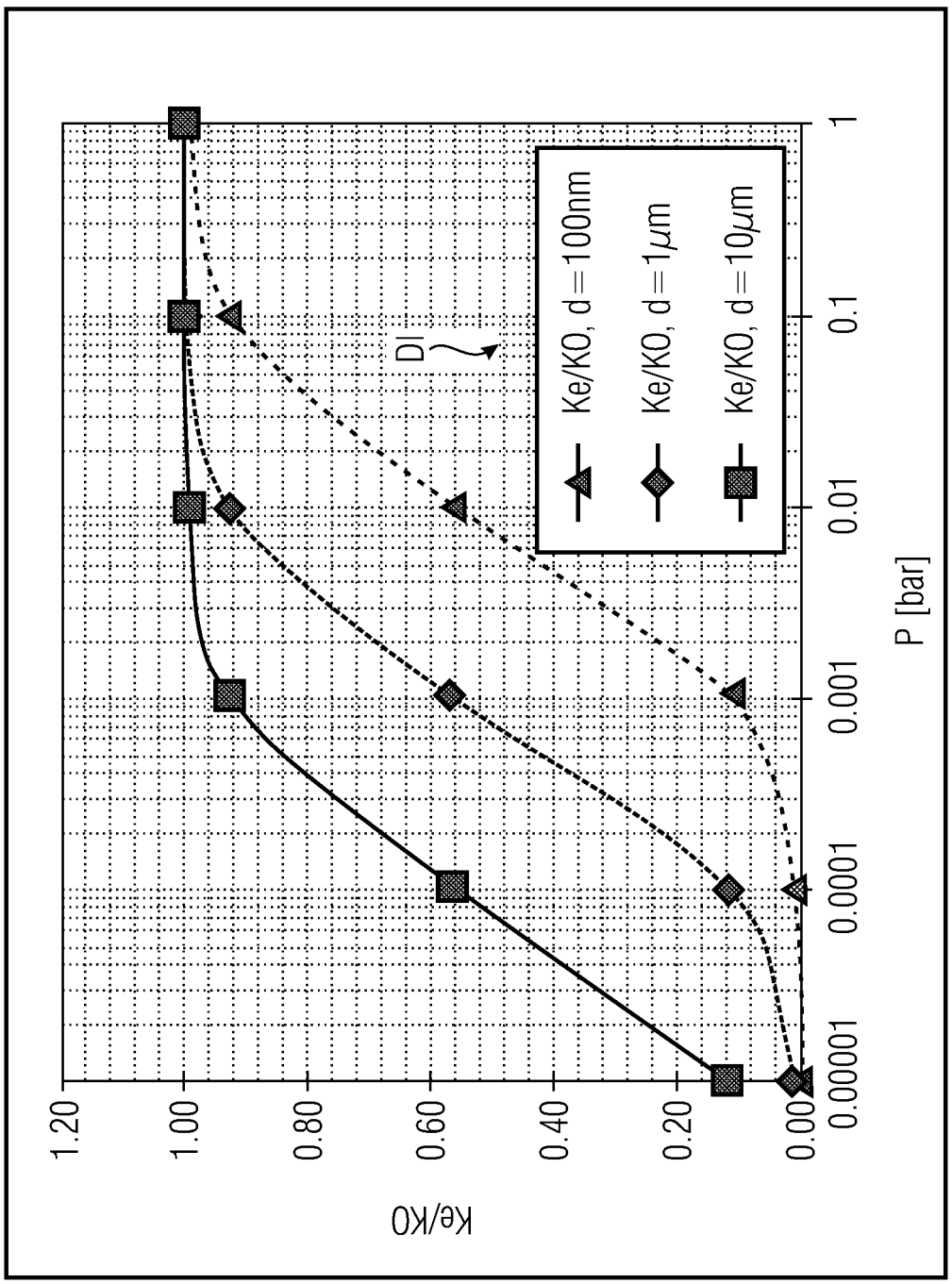
FIG. 11 shows an exemplary diagram showing normalized sensor responses for different distances between the electrically conductive heating structure and the electrically conductive sensing structure of the eighth embodiment of a thermoresistive micro sensor device.

FIG. 11 shows an exemplary diagram showing normalized sensor responses for different distances between the electrically conductive heating structure 22 and the electrically conductive sensing structure 23 of the eighth embodiment of a thermoresistive micro sensor device 1.

The normalized sensor responses Ke/KO depending on the pressure p are shown for distances DI having the values d=100 m, d=1 µm and d=10 µm. With decreasing the distance DI between the electrically conductive heating structure 22 and the electrically conductive sensing structure 23 the detectable pressure range is shifted up. Vice versa, with increasing distance DI it is shifted down, so that a plurality pressure ranges may be covered.

Figures 12, 13:
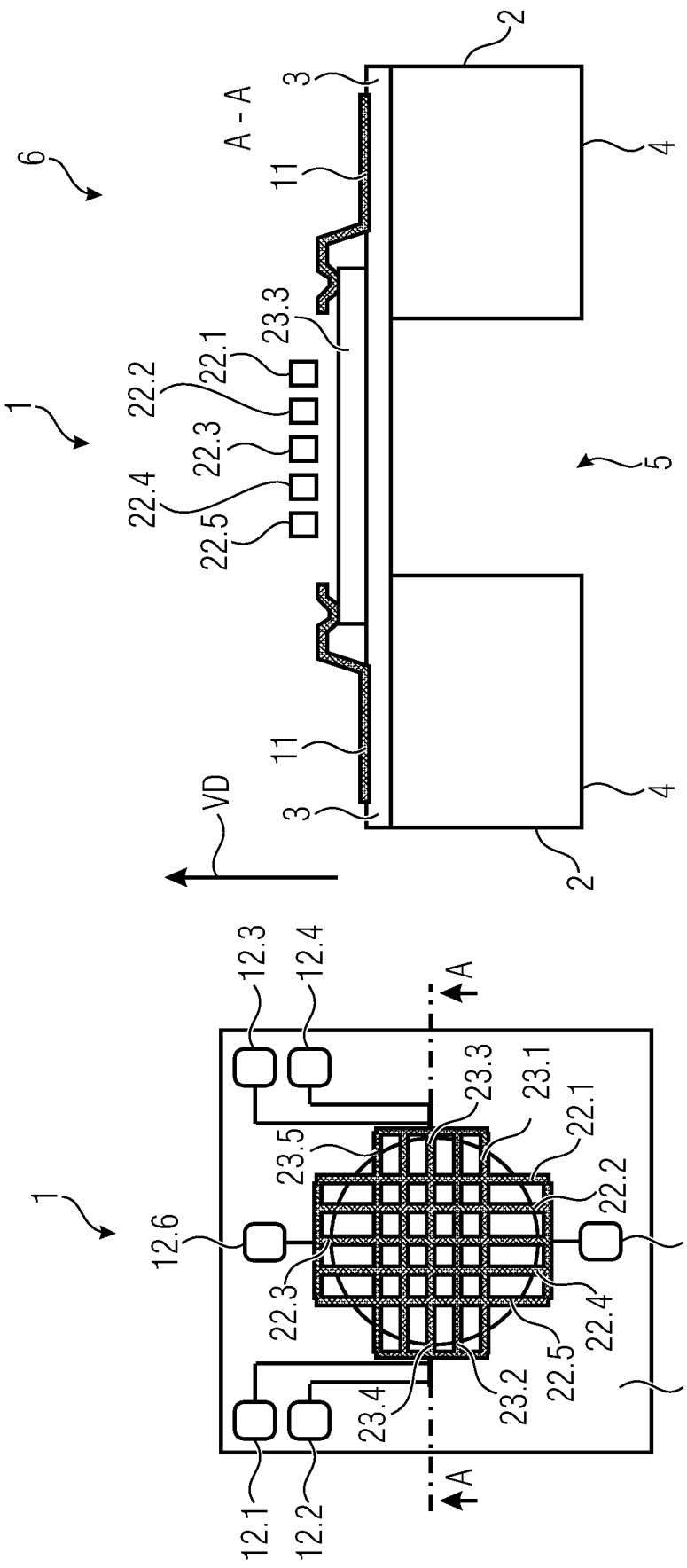
FIG. 12 shows a schematic top view of a ninth embodiment of a thermoresistive micro sensor device.
FIG. 13 shows a schematic cross-sectional side view of the ninth embodiment of the thermoresistive micro sensor device.

FIG. 12 shows a schematic top view of a ninth embodiment of a thermoresistive micro sensor device 1 and FIG. 13 shows a schematic cross-sectional side view of the ninth embodiment of the thermoresistive micro sensor device 1.

According to some embodiments the one or more electrically conductive structures 6 comprise a plurality of electrically conductive structures 6 which are spaced in a vertical direction VD apart from each other.

In this embodiment the electrically conductive sensing structures 23.1 to 23.5 are arranged parallelly in a mechanical and an electrical sense. The electrically conductive sensing structures 23.1 to 23.5 are connected to the contacts 12.1 to 12.4 so that four-terminal sensing is possible. The electrically conductive heating structures 22.1 to 22.5 are also arranged parallelly in a mechanical and an electrical sense. They are electrically connected to the contacts 12.6 and 12.9 so that they can be heated by applying electrical energy to the contacts 12.6 and 12.9. The electrically conductive heating structures 22.1 to 22.5 and the electrically conductive heating structures 22.1 to 22.5 are arranged in such way that they are in the top view perpendicular to each other. However, we also could be arranged at an arbitrary angle with respect to each other. Exemplary a number of the electrically conductive heating structures 22.1 to 22.5 and the electrically conductive sensing structures 23.1 to 23.5 is five. However, the number can be adjusted. Exemplary two layers of electrically conductive structures 6, 22 and 23 are shown. However a person skilled in the art would understand that more or less layers could be used.

Figure 14:
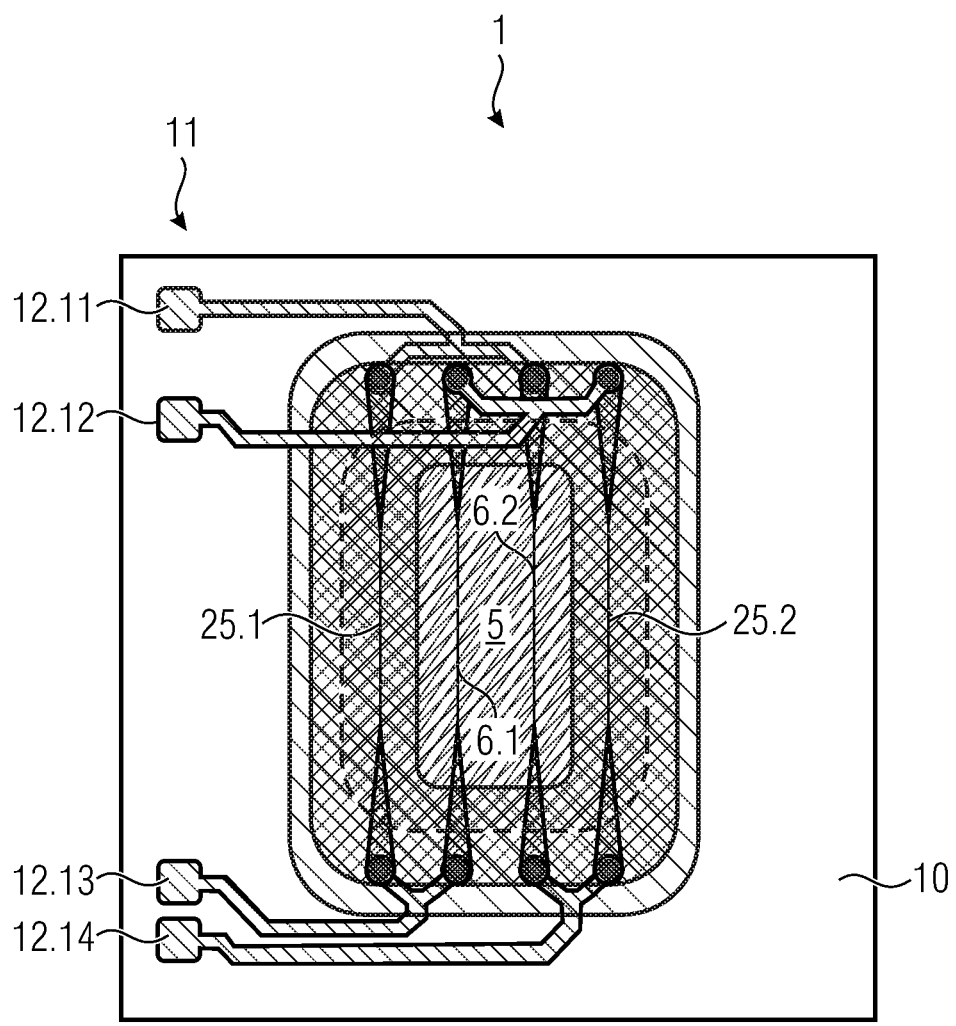
FIG. 14 shows a schematic top view of a tenth embodiment of a thermoresistive micro sensor device.

FIG. 14 shows a schematic top view of a tenth embodiment of a thermoresistive micro sensor device 1.

Here, two electrically conductive structures 6.1 and 6.2 are shown. Further, two reference sensing structures 25.1 and 25.2 are shown. The two electrically conductive structures 6.1 and 6.2 and the two reference sensing structures 25.1 and 24.2 are connected in such way that they form a Wheatstone bridge. The four terminals of the Wheatstone bridge are electrically connected to the contacts 12.11, 12.12, 12.13 and 12.14. The reference sensing structures 25.1 and 25.2 can be buried in the electrically insulating arrangement 10 or even in the semiconductor chip 2 in order to minimize thermal interaction with the environment.

Figure 15:
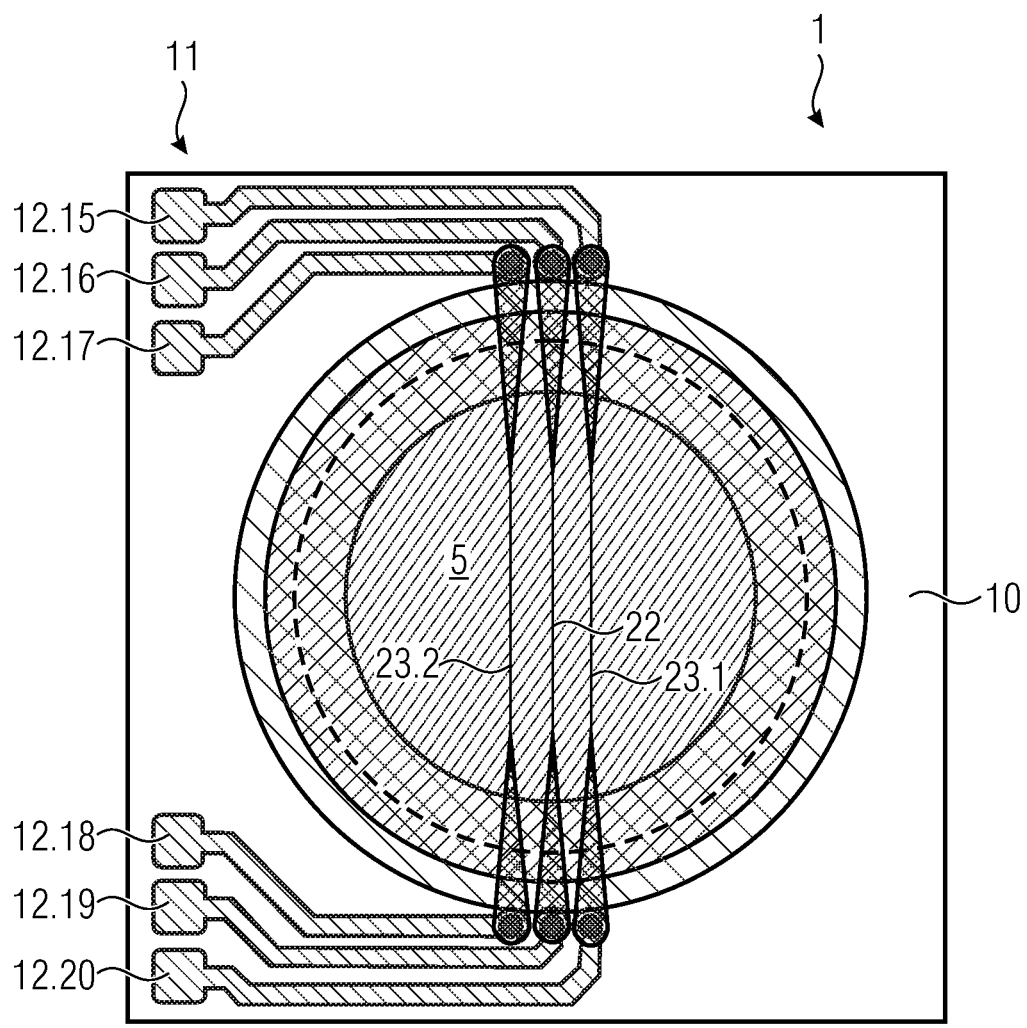
FIG. 15 shows a schematic top view of an eleventh embodiment of a thermoresistive micro sensor device.

FIG. 15 shows a schematic top view of an eleventh embodiment of a thermoresistive micro sensor device 1.

The exemplary layout comprises three electrically conductive structures 6 which comprise the electrically conductive heating structure 22 and two electrically conductive sensing structures 23.1 and 23.2. The latter two are arranged symmetrically with respect to the electrically conductive heating structure 22. The electrically conductive heating structure 22 is electrically connected to the contacts 12.16 and 12.19. The electrically conductive sensing structure 23.1 is electrically connected to the contacts 12.15 and 12.20 and the electrically conductive sensing structure 23.2 is connected to the contacts 12.17 and 12.18.

Figure 16:
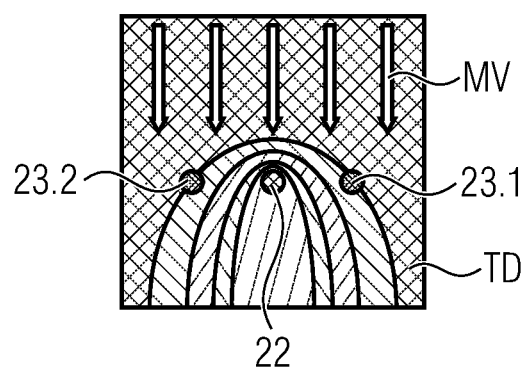
FIG. 16 shows an exemplary temperature distribution at a thermoresistive micro sensor device according to the eleventh embodiment.

FIG. 16 shows an exemplary temperature distribution TD at a thermoresistive micro sensor device 1 according to the eleventh embodiment. It's apparent that the temperature distribution TD depends on the mass flow MV of the fluid.

Figure 17:
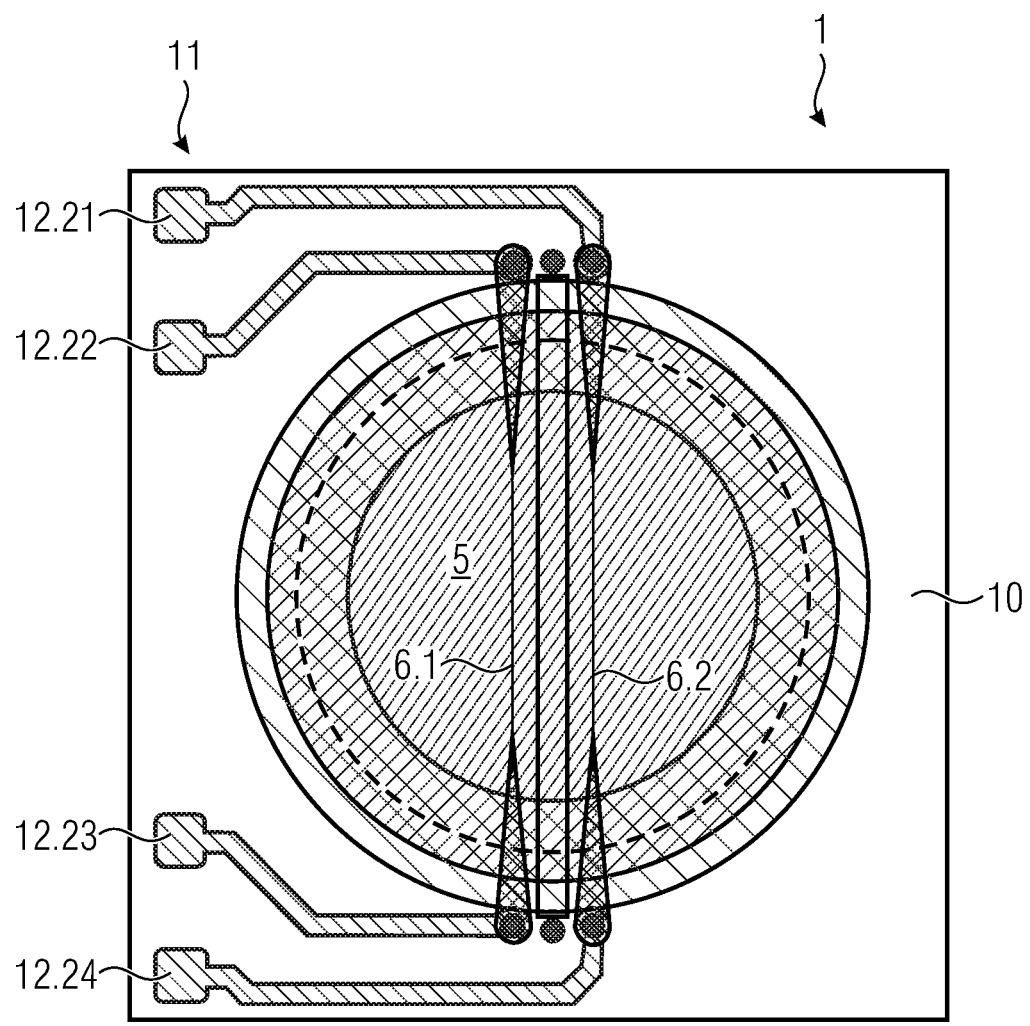
FIG. 17 shows a schematic top view of a twelfth embodiment of a thermoresistive micro sensor device.

FIG. 17 shows a schematic top view of a twelfth embodiment of a thermoresistive micro sensor device 1.

The embodiment shown here comprises two electrically conductive structures 6.1 and 6.2 which may be used for sensing and for heating. The electrically conductive structure 6.1 is connected to the contacts 12.22 and 12.23 and the electrically conductive structure 6.2 is connected to the contacts 12.21 and 12.24. An AC voltage may be applied between the electrically conductive structures 6.1 and 6.2 to deflect them symmetrically so that the output a signal which is modulated by the AC voltage. In this case the signal-to-noise ratio may be improved by AC band-pass filters. The frequency of the AC voltage may be the resonance frequency of the electrically conductive structures 6.1 and 6.2.

Figure 18:
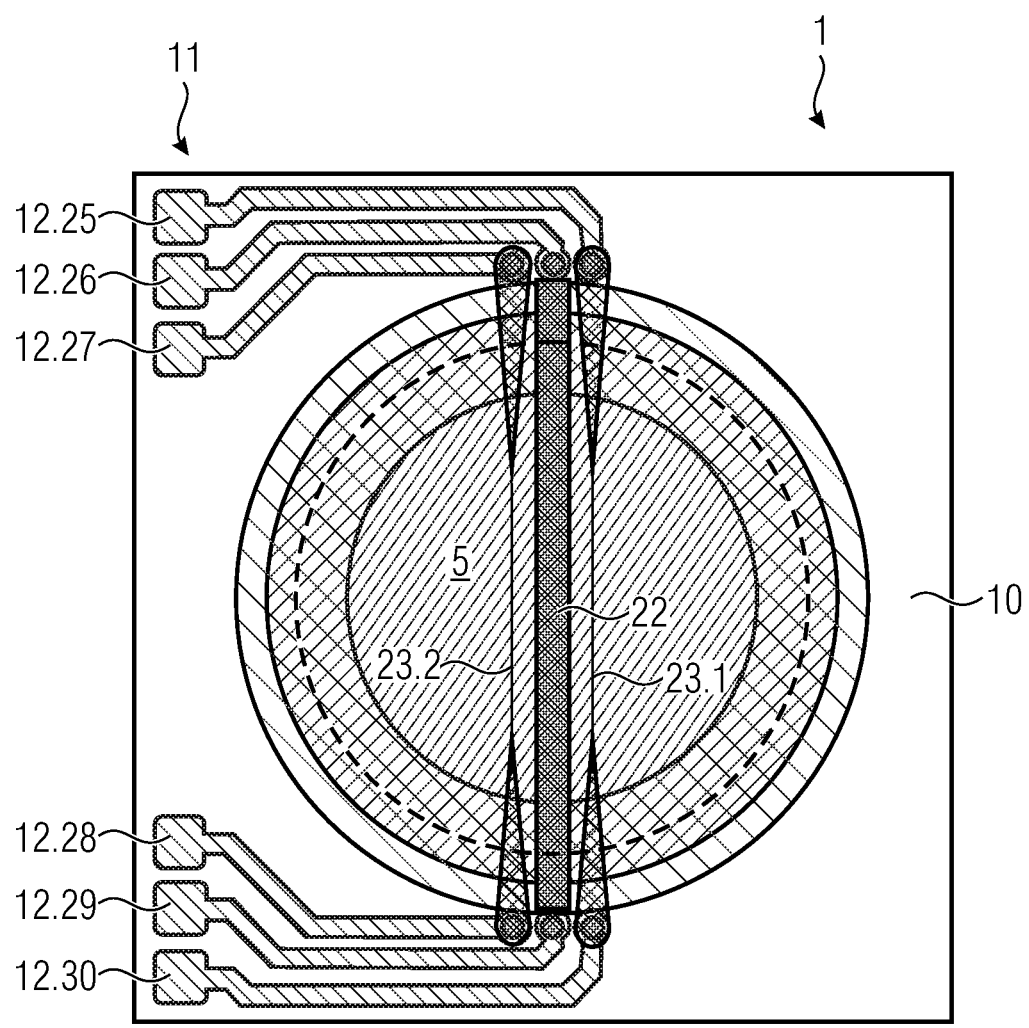
FIG. 18 shows a schematic top view of a thirteenth embodiment of a thermoresistive micro sensor device.

FIG. 18 shows a schematic top view of a thirteenth embodiment of a thermoresistive micro sensor device 1. The exemplary layout comprises three electrically conductive structures 6 which comprise the electrically conductive heating structure 22 and two electrically conductive sensing structures 23.1 and 23.2. The latter two are arranged symmetrically with respect to the electrically conductive heating structure 22. The electrically conductive heating structure 22 is electrically connected to the contacts 12.26 and 12.29. The electrically conductive sensing structure 23.1 is electrically connected to the contacts 12.25 and 12.30 and the electrically conductive sensing structure 23.2 is connected to the contacts 12.27 and 12.28. Heating power and sensing power are two independent parameters which may be optimized separately. The electrically conductive heating structure 22 is mechanically stiffer than the two electrically conductive sensing structures 23.1 and 23.2. If an AC voltage is applied to contacts 12.26 and 12.29, the two electrically conductive sensing structures 23.1 and 23.2 will be deflected periodically so that the output signal is modulated. In this case the signal-to-noise ratio may be improved by AC band-pass filters. The frequency of the AC voltage may be the resonance frequency of the electrically conductive sensing structures 23.1 and 23.2.

Figure 19:
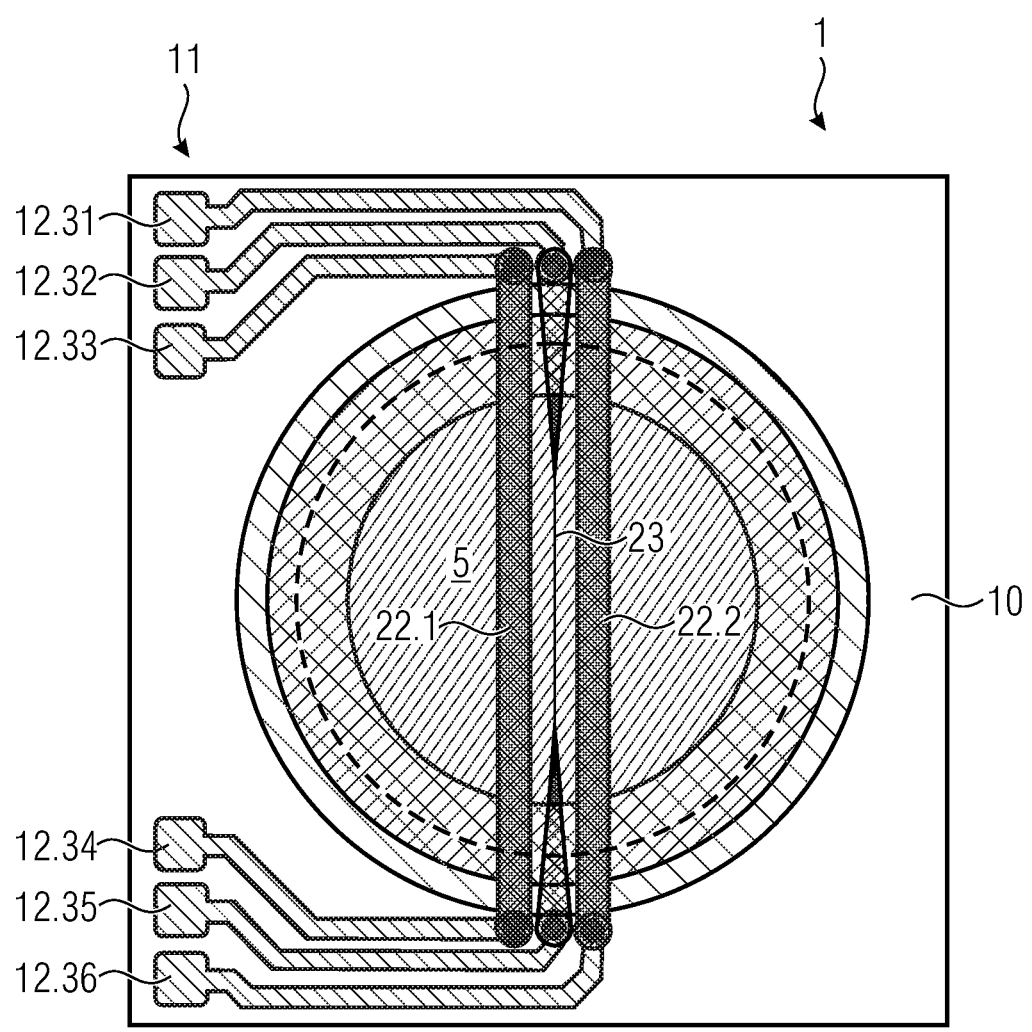
FIG. 19 shows a schematic top view of a fourteenth embodiment of a thermoresistive micro sensor device.

FIG. 19 shows a schematic top view of a fourteenth embodiment of a thermoresistive micro sensor device 1.

The exemplary layout comprises three electrically conductive structures 6 which comprise two electrically conductive heating structures 22.1 and 22.2 and the electrically conductive sensing structure 23. The first two are arranged symmetrically with respect to the electrically conductive sensing structure 23. The electrically conductive heating structure 22.1 is electrically connected to the contacts 12.33 and 12.34. The electrically conductive heating structure 22.2 is electrically connected to the contacts 12.31 and 12.36 and the electrically conductive sensing structure 23 is connected to the contacts 12.32 and 12.34. Heating power and sensing power are two independent parameters which may be optimized separately. The two electrically conductive heating structures 22.1 and 22.2 are mechanically stiffer than the electrically conductive sensing structure 23. If an AC voltage is applied between contacts 12.33 and 12.34 and between contacts 12.31 and 12.36, the electrically conductive sensing structure 23 will be deflected periodically so that the output signal is modulated. In this case the signal-to-noise ratio may be improved by AC band-pass filters. The frequency of the AC voltage may be the resonance frequency of the electrically conductive sensing structure 23.

Figure 20:
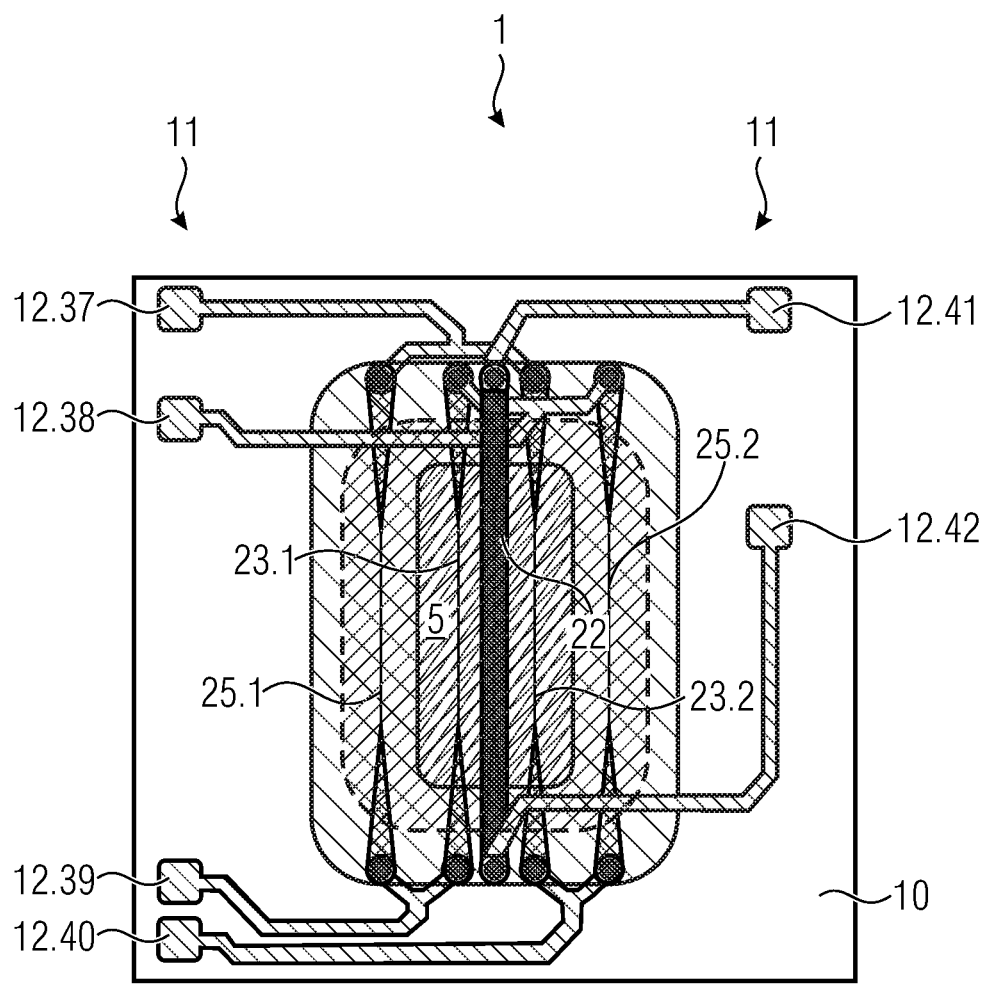
FIG. 20 shows a schematic top view of a fifteenth embodiment of a thermoresistive micro sensor device.

FIG. 20 shows a schematic top view of a fifteenth embodiment of a thermoresistive micro sensor device 1.

Here, two electrically conductive sensing structures 23.1 and 23.2 are shown. Further, two reference sensing structures 25.1 and 25.2 are shown. The two electrically conductive sensing structures 23.1 and 23.2 and the two reference sensing structures 25.1 and 24.2 are connected in such way that they form a Wheatstone bridge. The four terminals of the Wheatstone bridge are electrically connected to the contacts 12.37, 12.38, 12.39 and 12.40. The reference sensing structures 25.1 and 25.2 can be buried in the electrically insulating arrangement 10 or even in the semiconductor chip 2 in order to minimize thermal interaction with the environment. In this embodiment the sensing function is separated from the heating function. For the heating function an additional electrically conductive heating structure 22, which is stiffer than the two electrically conductive sensing structures 23.1 and 23.2, is provided. The electrically conductive heating structure 22 is electrically connected to the contacts 12.41 and 12.42. If an AC voltage is applied between contacts 12.41 and 12.42, the electrically conductive sensing structures 23.1 and 23.2 will be deflected periodically so that the output signal is modulated. In this case the signal-to-noise ratio may be improved by AC band-pass filters. The frequency of the AC voltage may be the resonance frequency of the electrically conductive sensing structures 23.1 and 23.2.

Figure 21:
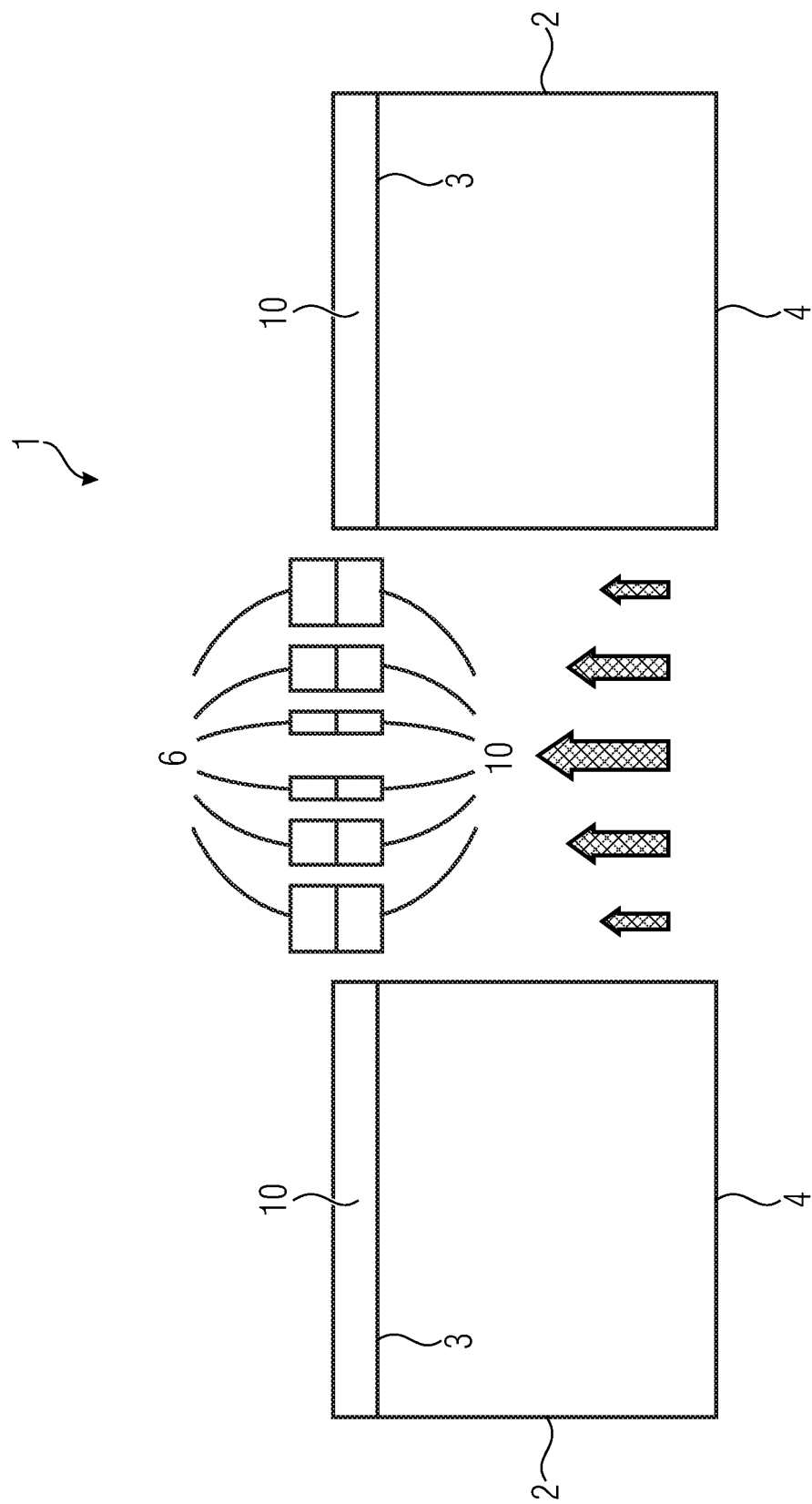
FIG. 21 shows a schematic cross-sectional side view of a sixteenth embodiment of the thermoresistive micro sensor device.

FIG. 21 shows a schematic cross-sectional side view of a sixteenth embodiment of the thermoresistive micro sensor device 1. Here, the plurality of electrically conductive structures 6 are shown, wherein each of the electrically conductive structure 6 is supported by a portion of the electrically insulating arrangement 10. It's well-known that the speed of the fluid which is guided through a through hole 5 has a maximum at the center of the through hole 5, it is if there are no obstacles in the flow path. In order to compensate this, the electrically conductive structure 6 are arranged in such way that in a center portion of the through hole 5 higher partial mass flow is possible than in a peripheral portion of the through hole 5.

All of the variants above can be stacked vertically for increased sensitivity as well as directionality of the flow measurement.

Figure 22:
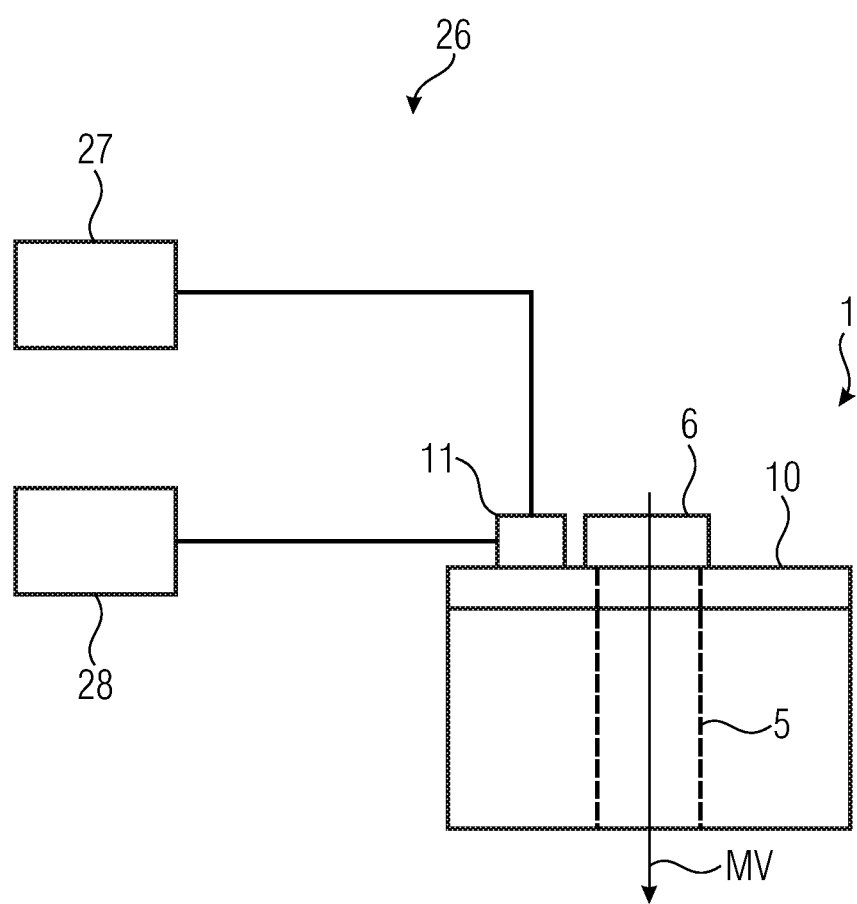
FIG. 22 shows a schematic top view of an embodiment of a mass flow meter comprising a thermoresistive micro sensor device.

FIG. 22 shows a schematic top view of an embodiment of a mass flow meter 26 for measuring a mass flow of a fluid.

The mass flow meter 26 comprises a thermoresistive micro sensor device 1 according to one of the claims 1 to 15;

an electrical energy supply unit 27 for supplying the electrical energy to the contact arrangement 11; and a measuring unit 28 for measuring the electrical resistance at the contact arrangement 11;

wherein the measuring unit 28 is configured for measuring the mass flow MV of the fluid flowing through the through hole 5 depending on the electrical resistance.

Figure 23:
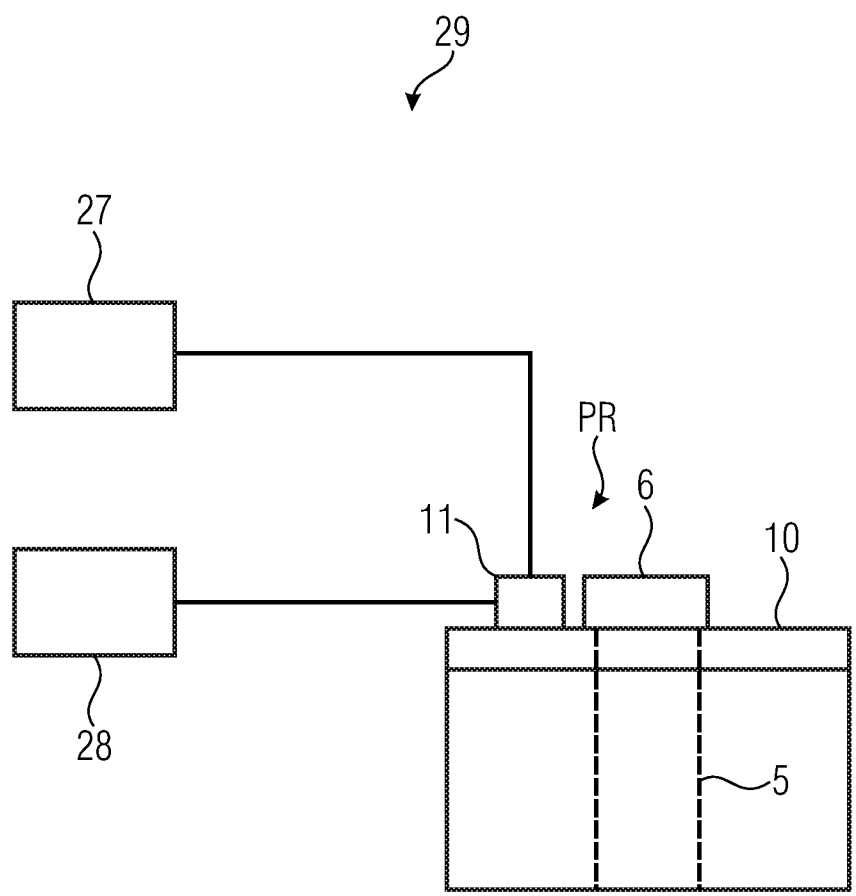
FIG. 23 shows a schematic top view of an embodiment of a pressure meter comprising a thermoresistive micro sensor device.

FIG. 23 shows a schematic top view of an embodiment of a pressure meter for measuring a pressure in a fluid.

The pressure meter 29, the pressure comprises a thermoresistive micro sensor device 1 according to one of the claims 1 to 15;

an electrical energy supply unit 27 for supplying the electrical energy to the contact arrangement 11; and a measuring unit 28 for measuring the electrical resistance at the contact arrangement;

wherein the measuring unit 28 is configured for measuring the pressure PR of the fluid at the through hole 5 depending on the electrical resistance.

Embodiments may comprise one or more of the following features:

One or more (poly-silicon) heating/sensing structures are suspended completely exposed above a hole that runs vertically through the whole chip.

The sensing/heating structures are arranged side-by-side and/or above each other (in multiple, separate layers).

At least one of those sensing/heating structures is used for resistive/joule heating.

The fluid flow is guided through the hole in the chip and has to pass the sensing/heating structure(s).

The fluid transports thermal energy away from the heating structure(s).

The sensing structure(s) receive(s) a temperature change, which can be measured as a shift in resistance.

This disclosure proposes in particular the placement of several polysilicon heating and sensing structures above a hole in the substrate of a silicon chip, in particular leaving those structures completely exposed to fluid passing through perpendicular to the chip surface. The exposed heating/sensing structures exhibit a high sensitivity to temperature changes due to their low volume-to-surface-ratio as well as the small heat capacity caused by the low mass and good thermal insulation at the heating/sensing structure support. Due to the low fluidic resistance, the sensor exhibits a flow optimized measurement principle for low flow rates. This device can both be used as an anemometer for measuring mass flow of fluids, as well as a pressure meter for measuring a pressure in different ranges. MEMS structure capabilities can be used to vary/adjust the sensor in field measurements by using moveable mechanical structures (example pressure meter with electrostatic actuation).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A thermoresistive sensor for a fluid meter, the thermoresistive sensor comprising:
    a semiconductor chip having an upper side and a lower side;
    a through hole extending through the semiconductor chip from the upper side to the lower side; three electrical conductors aligned with the through hole;
    an electrical insulator configured for electrically insulating the three electrical conductors and the semiconductor chip from each other; and
    six electrical contacts electrically connected to the three electrical conductors and respectively configured as three electrical circuits, wherein at least one of the three electrical conductors is configured for deflection, wherein the thermoresistive sensor is configured to measure a flow rate or a pressure of a fluid, wherein the three electrical conductors are configured so that, in a center portion of the through hole, a higher partial mass flow is possible than in a peripheral portion of the through hole, and wherein a first electrical conductor has a first width, a second electrical conductor has a second width different from the first width, and a third electrical conductor has a third width different from the first width and the second width.

2. The thermoresistive sensor of claim 1, wherein the through hole has a circular shape, and wherein the thermoresistive sensor has at least one line of symmetry.

3. The thermoresistive sensor of claim 1, wherein a first electrical circuit comprises a first electrical contact and a second electrical contact to a first electrical conductor, a second electrical circuit comprises a third electrical contact and a fourth electrical contact to a second electrical conductor, and a third electrical circuit comprises a fifth electrical contact and a sixth electrical contact to a third electrical conductor.

4. The thermoresistive sensor of claim 3, wherein the first electrical conductor is a sensing structure, the second electrical conductor is a heating structure, and the third electrical conductor is an actuator configured to deflect.

5. The thermoresistive sensor of claim 4, wherein the actuator is selected from at least one of: a thermomechanical actuator, a piezoelectric actuator, or an electrostatic actuator.

6. The thermoresistive sensor of claim 4, wherein the actuator is configured to deflect at a middle portion, wherein a distance between the actuator and the heating structure or the sensing structure is changed.

7. The thermoresistive sensor of claim 4, wherein, absent deflection of the actuator, the first electrical conductor, the second electrical conductor, and the third electrical conductor are equidistant from each other.

8. The thermoresistive sensor of claim 3, wherein the first electrical conductor and the third electrical conductor are sensing structures configured for deflection, and the second electrical conductor is a heating structure.

9. The thermoresistive sensor of claim 3, wherein the first electrical conductor and the third electrical conductor are heating structures, and the second electrical conductor is a sensing structure configured for deflection.

10. A fluid meter comprising:
   a thermoresistive sensor chip having an upper side and a lower side;
   a through hole extending through the thermoresistive sensor chip from the upper side to the lower side;
   three electrical conductors aligned with the through hole, wherein a first electrical conductor has a first width, a second electrical conductor has a second width different from the first width, and a third electrical conductor has a third width different from the first width and the second width;
   an electrical insulator configured for electrically insulating the three electrical conductors and the thermoresistive sensor chip from each other;
   six electrical contacts electrically connected to the three electrical conductors and configured as three electrical circuits; and
   a power supply for electrically powering the fluid meter, wherein at least one of the three electrical conductors is configured for deflection, and wherein the fluid meter is configured to measure a flow rate or a pressure of a fluid.

11. The fluid meter of claim 10, wherein the through hole has a circular shape, and wherein the thermoresistive sensor chip has at least one line of symmetry.

12. The fluid meter of claim 10, wherein a first electrical circuit comprises a first electrical contact and a second electrical contact to a first electrical conductor, a second electrical circuit comprises a third electrical contact and a fourth electrical contact to a second electrical conductor, and a third electrical circuit comprises a fifth electrical contact and a sixth electrical contact to a third electrical conductor.

13. The fluid meter of claim 12, wherein the first electrical conductor is a sensing structure, the second electrical conductor is a heating structure, and the third electrical conductor is an actuator configured to deflect.

14. The fluid meter of claim 13, wherein the actuator is selected from at least one of: a thermomechanical actuator, a piezoelectric actuator, or an electrostatic actuator.

15. The fluid meter of claim 13, wherein the actuator is configured to deflect at a middle portion, wherein a distance between the actuator and the heating structure or the sensing structure is changed.

16. The fluid meter of claim 13, wherein, absent deflection of the actuator, the first electrical conductor, the second electrical conductor, and the third electrical conductor are equidistant from each other.

17. The fluid meter of claim 12, wherein the first electrical conductor and the third electrical conductor are sensing structures configured for deflection, and the second electrical conductor is a heating structure.

18. The fluid meter of claim 12, wherein the first electrical conductor and the third electrical conductor are heating structures, and the second electrical conductor is a sensing structure configured for deflection.

19. A mass flow meter comprising:
   a thermoresistive sensor chip having an upper side and a lower side;
   a through hole extending through the thermoresistive sensor chip from the upper side to the lower side;
   three electrical conductors aligned with the through hole;
   an electrical insulator configured for electrically insulating the three electrical conductors and the thermoresistive sensor chip from each other;
   six electrical contacts electrically connected to the three electrical conductors and configured as three electrical circuits; and
   a power supply for electrically powering the mass flow meter, wherein at least one of the three electrical conductors is configured for deflection, and wherein the mass flow meter is configured to measure a mass flow of a fluid, wherein a first electrical conductor and a first electrical insulator have a first width and are closest to a center portion of the through hole, a second electrical conductor and a second electrical insulator have a second width, a third electrical conductor and a third electrical insulator have a third width and are furthest from the center portion of the through hole, and wherein the first width and the third width are different widths.

20. The mass flow meter of claim 19, wherein the through hole has a circular shape, and wherein the thermoresistive sensor chip has at least one line of symmetry.

* * * * *